(12) United States Patent
Takata et al.

(10) Patent No.: US 8,677,080 B2
(45) Date of Patent: Mar. 18, 2014

(54) METHOD OF CONTROLLING TOTAL CAPACITY OF VIRTUAL VOLUMES ASSOCIATED WITH POOL AND STORAGE APPARATUS

(75) Inventors: Yutaka Takata, Ninomiya (JP); Shintaro Inoue, Odawara (JP)

(73) Assignee: Hitachi, Ltd., Tokyo (JP)

(*) Notice: Subject to any disclaimer, the term of this patent is extended or adjusted under 35 U.S.C. 154(b) by 814 days.

(21) Appl. No.: 12/935,908

(22) PCT Filed: Apr. 27, 2010

(86) PCT No.: PCT/JP2010/003018
§ 371 (c)(1),
(2), (4) Date: Sep. 30, 2010

(87) PCT Pub. No.: WO2011/135617
PCT Pub. Date: Nov. 3, 2011

(65) Prior Publication Data
US 2011/0264868 A1  Oct. 27, 2011

(51) Int. Cl.
*G06F 12/00* (2006.01)
(52) U.S. Cl.
USPC ............ 711/154; 711/111; 711/112; 711/203
(58) Field of Classification Search
USPC ................................ 711/5, 111, 112, 154, 203
See application file for complete search history.

(56) References Cited

U.S. PATENT DOCUMENTS

| 6,823,442 | B1 | 11/2004 | Cameron |
| 7,032,093 | B1 | 4/2006 | Cameron |
| 2008/0091748 | A1 | 4/2008 | Beniyama et al. |
| 2010/0023685 | A1 | 1/2010 | Ikejiri et al. |
| 2010/0077158 | A1 | 3/2010 | Asano et al. |
| 2011/0252214 | A1* | 10/2011 | Naganuma et al. ........... 711/170 |

FOREIGN PATENT DOCUMENTS

| JP | 2008-097502 | 4/2008 |
| JP | 2010-033261 | 2/2010 |
| JP | P2010-073095 | 4/2010 |

OTHER PUBLICATIONS

PCT Search Report on Application No. PCT/JP2010/003018 dated May 25, 2010; 2 pages.

* cited by examiner

*Primary Examiner* — Arpan P. Savla
(74) *Attorney, Agent, or Firm* — Foley & Lardner LLP

(57) ABSTRACT

The statuses of an actual area are (1) a first status which indicates that [the actual area] is already initialized and can be assigned to a virtual area, (2) a second status which indicates that [the actual area] is already assigned to a virtual area, and (3) a third status which indicates that [the actual area] cannot be assigned to a virtual area and initialization which is specified data write is to be performed. The storage controller limits the total virtual volume capacity which is the total capacity of one or more virtual volumes which are associated with the pool, in accordance with whether the pool comprises an actual page in the third status or not, to the capacity of the pool or smaller.

15 Claims, 26 Drawing Sheets

FIG. 7A

| VOL number | VOL type | Association flag | Capacity | Pool number | Pointer |
|---|---|---|---|---|---|
| 00 | Virtual | ON | 40GB | 00 | TBL#00 |
| 01 | Virtual | OFF | 80GB | NULL | NULL |
| 02 | Pool | NULL | 40GB | NULL | NULL |
| ... | ... | ... | ... | ... | ... |

VOL management table

FIG. 7B

TBL#00

| Virtual page number | Pointer |
|---|---|
| 000 | Page information #100 |
| 001 | NULL |
| ... | ... |

Mapping table

FIG. 9A

Page information

| |
|---|
| Next pointer (7011) |
| Pool VOL address (7012) |
| VVOL address (7013) |
| Status (7014) |

| Pool number (5041) | Number of pool VOLs (5042) | Number of actual pages (5043) | Number of free pages (5044) | Threshold (5045) | Number of VVOLs (5046) | Total number of virtual pages (5047) |
|---|---|---|---|---|---|---|
| 0 | 10 | 10000 | 10000 | 95 | 10 | 10000 |
| 1 | 0 | 0 | 0 | NULL | 0 | 0 |
| 2 | 20 | 20000 | 10000 | 80 | 40 | 40000 |
| 3 | 30 | 30000 | 5000 | 80 | 50 | 50000 |
| ... | ... | ... | ... | ... | ... | ... |

Pool management table

504

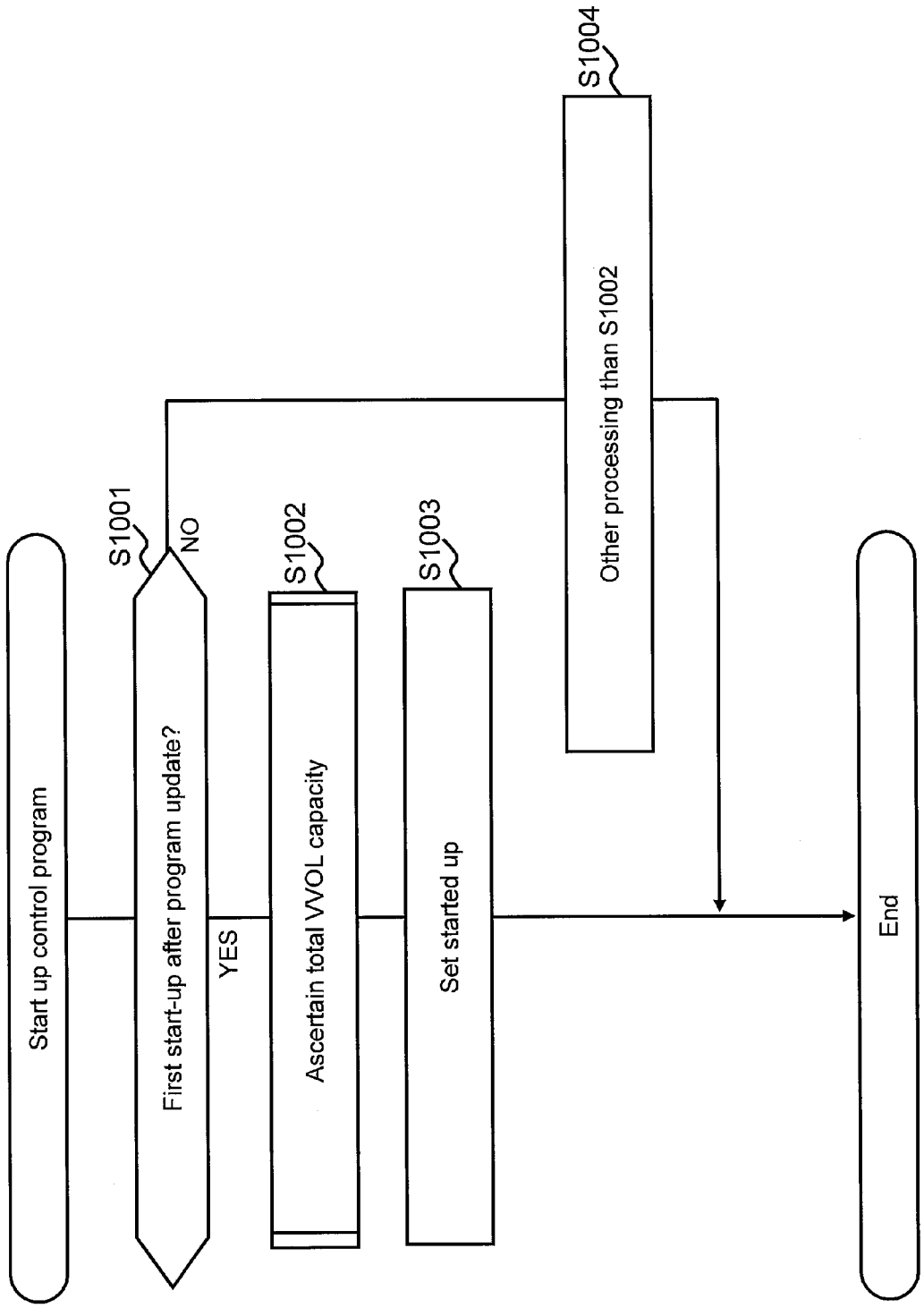

| VVOL number | Association flag | Capacity | Pool number |
|---|---|---|---|
| 00 | ON | 40GB | 00 |
| 01 | OFF | 80GB | NULL |
| ... | ... | ... | ... |

| Pool number | Pool capacity | Usage capacity | Threshold |
|---|---|---|---|
| 00 | 40GB | 20GB | 95 |
| 01 | 80GB | 75GB | 0 |
| ... | ... | ... | ... |

FIG. 19

| Pool number | Pool capacity | Usage capacity | Deletion capacity |
|---|---|---|---|
| 00 | 40GB | 20GB | 0GB |
| 01 | 80GB | 75GB | 1GB |
| ... | ... | ... | ... |

1901

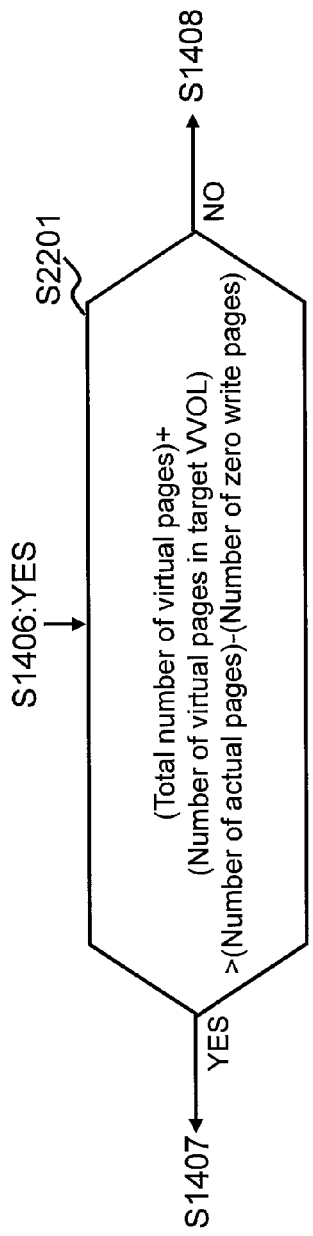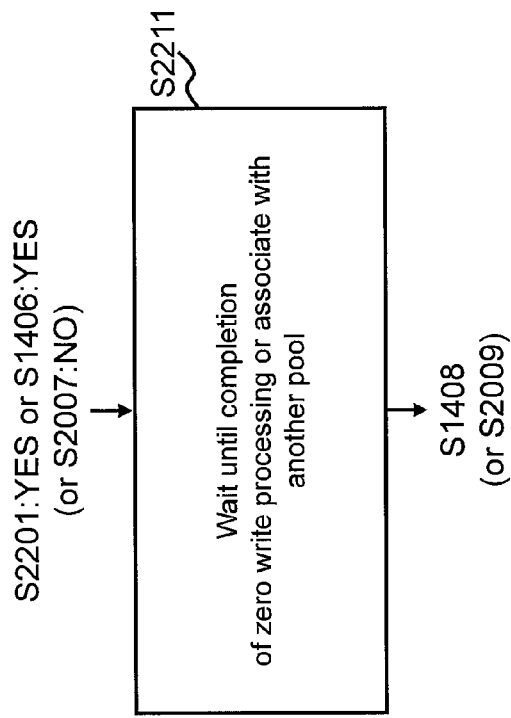
FIG. 22A
FIG. 22B

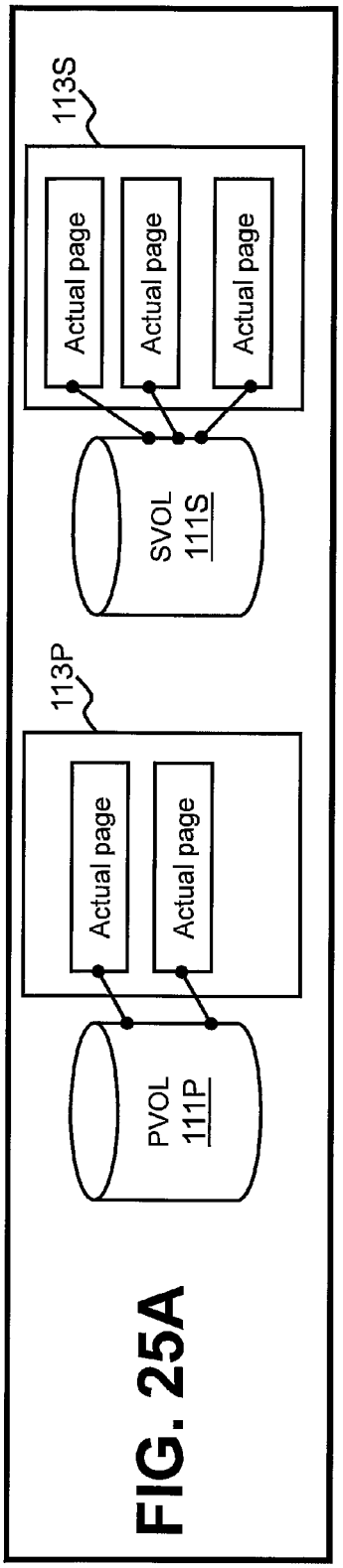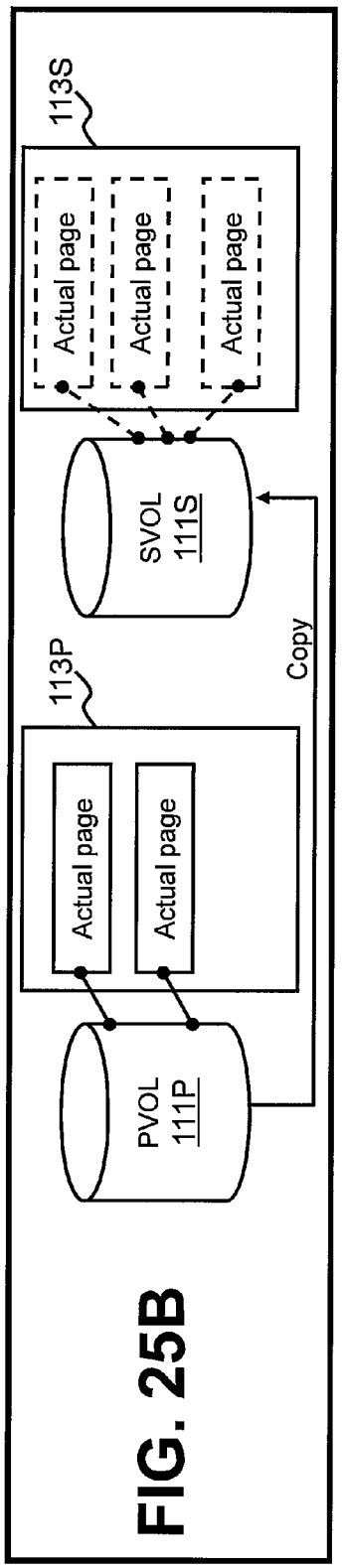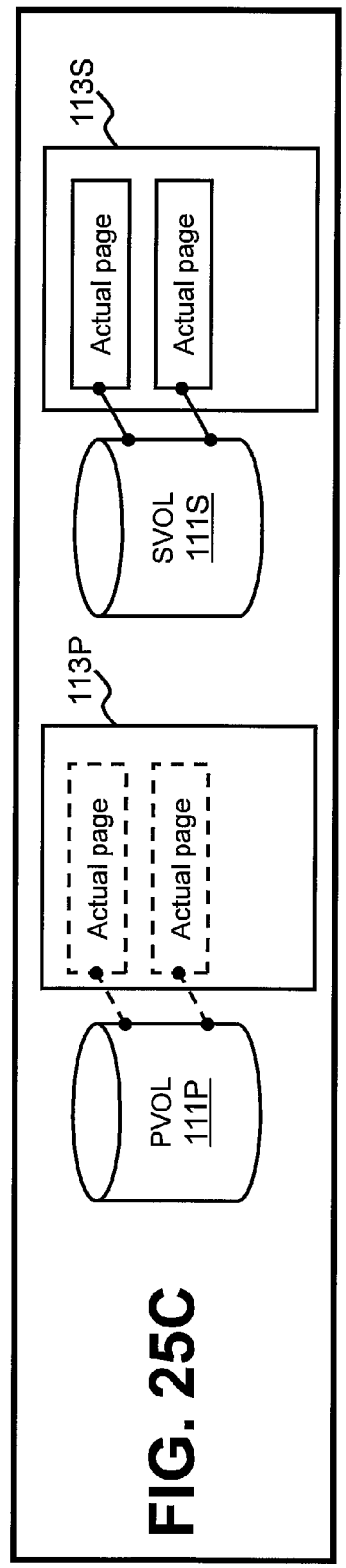

FIG. 26

Tier management table 506

| Pool number | Tier number | PDEV type | Page information pointer |
|---|---|---|---|
| 0 | 00 | SSD | ... |
|  | 01 | SAS | ... |
|  | 02 | SATA | ... |
| 1 | ... | ... | ... |
| ... |  |  |  |

5061　5062　5063　5064

METHOD OF CONTROLLING TOTAL CAPACITY OF VIRTUAL VOLUMES ASSOCIATED WITH POOL AND STORAGE APPARATUS

TECHNICAL FIELD

This invention relates to storage control complying with Thin Provisioning.

BACKGROUND ART

A storage apparatus to which Thin Provisioning (also referred to as Dynamic Provisioning) is applied is known. The storage apparatus generally provides a virtual logical volume (hereinafter referred to as a virtual volume) configured of multiple virtual pages, and comprises a pool configured of multiple actual pages. The storage apparatus, in case of writing data to an unassigned virtual page, assigns an actual page to the write destination virtual page from the pool, and writes the write target data to the assigned actual page. The virtual page is a virtual storage area, and the actual page is an actual storage area.

As the technologies related to this type of storage apparatus, for example, the technologies disclosed in the Patent Literatures 1 and 2 are known.

According to the Patent Literature 1, if the number of actual pages is zero, a physical storage device is added and, in accordance with the physical storage device, a logical disk is newly generated. By the logical disk being divided, actual pages which can be assigned are newly generated.

According to the Patent Literature 2, if the storage apparatus receives a write command from a host and if there is no actual page which can be assigned, fail is returned to the host. That is, the write is considered to have failed.

CITATION LIST

Patent Literature

PTL 1: U.S. Pat. No. 7,032,093, Description
PTL 2: U.S. Pat. No. 6,823,442, Description

SUMMARY OF INVENTION

Technical Problem

The capacity of a virtual volume (VVOL) is determined regardless of the capacity of a pool. Generally, the total capacity of one or more virtual volumes is larger than the capacity of one or more pools.

Then, in case of writing data to an unassigned virtual page, if there is no actual page which can be assigned (free actual page) in the pool, the write is considered to have failed.

As a method for avoiding the same, the method in which the number of free actual pages in the pool is monitored and, if the number becomes smaller than a specified number, the capacity of the pool is expanded can be considered.

However, there can be cases where the pool capacity cannot be expanded in time. As that case, the case where write to an unassigned virtual page is frequently performed immediately after the number of free actual pages becomes smaller than the specified number can be considered. If the pool capacity cannot be expanded in time, the failure in the write is considered to be inevitable.

Therefore, the purpose of this invention is to prevent the insufficiency of actual pages which can be assigned.

Solution to Problem

The statuses of an actual page are (1) a first status which indicates that [the actual page] is already initialized and can be assigned to a virtual page, (2) a second status which indicates that [the actual page] is already assigned to a virtual page, and (3) a third status which indicates that [the actual page] cannot be assigned to a virtual page and initialization which is specified data write is to be performed.

A storage controller receives a write command for an unassigned virtual page in the virtual volume from the host (e.g. a physical or virtual computer) and, from the pool with which the virtual volume is associated, assigns an actual page in the first status, and changes the status of the actual page to the second status.

Furthermore, the storage controller changes the status of the actual page assigned to the virtual page to the third status at certain timing.

Furthermore, the storage controller initializes the actual page in the third status and, if the initialization is completed, changes the status of the actual page to the first status.

The storage controller limits the total virtual volume capacity which is the total capacity of one or more virtual volumes which are associated with the pool, in accordance with whether the pool comprises an actual page in the third status or not, to the capacity of the pool or smaller.

The storage controller may be a controller which the storage apparatus comprises or may also be a device for relaying the communication between the storage apparatus and the host (e.g. a server device or an intelligent switch device).

BRIEF DESCRIPTION OF DRAWINGS

FIG. 1 shows the overview related to the Embodiment 1 of this invention.
FIG. 2 shows the statuses of actual pages and the transition flow of the statuses.
FIG. 3 shows the configuration of a storage apparatus related to the Embodiment 1 of this invention.
FIG. 4 shows the relationship of respective storage areas in the storage apparatus 101.
[FIG. 5]
FIG. 6 shows the relationship of various types of information in the management information.
[FIG. 7]
FIG. 7A shows a VOL management table 501.
FIG. 7B shows a mapping table 503.
[FIG. 8]
[FIG. 9]
FIG. 9A shows [a] page information [table] 701.
FIG. 9B shows a pool management table 504.
[FIG. 10]
FIG. 10 shows the flow of the processing at the time of starting up the control program 551.
FIG. 11 shows the flow of ascertaining the total VVOL capacity.
[FIG. 12]
FIG. 12A shows a VVOL list 1211.
FIG. 12B shows a pool list 1221.
FIG. 13 shows the flow of VVOL association.
FIG. 14 shows the flow of VVOL capacity check.
FIG. 15 shows the flow of zero write check.
FIG. 16 shows the flow of cancelling the VVOL association.

FIG. 17 shows the flow of the zero write processing.

FIG. 18 shows the flow of ascertaining the deletion capacity.

[FIG. 19] FIG. 19 shows a pool list 1901.

FIG. 20 shows the flow of the VVOL capacity expansion.

FIG. 21 shows the comparison of the difference between the number of actual pages 5043 in the target pool and the number of zero write pages in the target pool with the sum of the total number of virtual pages 5047 in the target pool and the number of virtual pages for the amount of the expanded capacity.

[FIG. 22] FIG. 22A shows the processing performed in the Embodiment 2 of this invention. FIG. 22B shows the processing performed in the Embodiment 3 of this invention.

FIG. 23 shows the flow of the processing performed in the Embodiment 4 of this invention.

FIG. 24 shows the flow of the zero write processing related to the Embodiment 5 of this invention.

[FIG. 25] FIG. 25A shows an example of the condition before the inter-VVOL copy related to the Embodiment 6 of this invention. FIG. 25B shows that inter-VVOL copy is performed after changing the status of the actual pages assigned to the secondary VVOL. FIG. 25C shows the condition after the completion of the inter-VVOL copy.

[FIG. 26] FIG. 26 shows a tier management table 506.

DESCRIPTION OF EMBODIMENTS

Hereinafter, with reference to the figures, some embodiments of this invention are described.

Note that, though the description below might describe various types of information using the term of "an xxx table" and "an xxx list," the various types of information may also be expressed by other data structures than tables and lists. For showing the independence of the data structure, "an xxx table" and "an xxx list" can be referred to as "xxx information."

Furthermore, though the description below uses numbers as the identification information of various targets, other types of identification information than numbers (e.g. identifiers including alphabetical characters and symbols) may also be adopted.

Furthermore, in the description below, though the processing might be described with a "program" as a subject, since the program performs the specified processing by being executed by a processor (e.g. a CPU (Central Processing Unit)), using a storage resource (e.g. a memory) and/or a communication interface device (e.g. a communication port) appropriately, the subject of the processing may also be a processor. The processing described with the program as a subject may also be supposed to be the processing performed by a storage apparatus or a storage controller. Furthermore, the processor may also include a hardware circuit which performs a part of or the entire processing which the processor performs. The computer program may also be installed from a program source to each computer. The program source, for example, may also be a program distribution server or storage media.

Furthermore, in the description below, a logical volume might be stated as a "VOL" and a virtual logical volume as a "VVOL."

Furthermore, in the description below, a target P whose number is xx might be referred to as a "P #xx." For example, a VVOL whose VOL number is 01 might be referred to as a "VVOL #01."

Furthermore, in the description below, a virtual page and an actual page are of the same capacity (size), and therefore one actual page is assigned to one virtual page. However, not limited to that, multiple actual pages may also be assigned to one virtual page, and one actual page may also be assigned to multiple virtual pages.

Furthermore, in the description below, the capacity (size) of a virtual page and the capacity of an actual page are invariable, but may also be variable.

Embodiment 1

Figure 1:
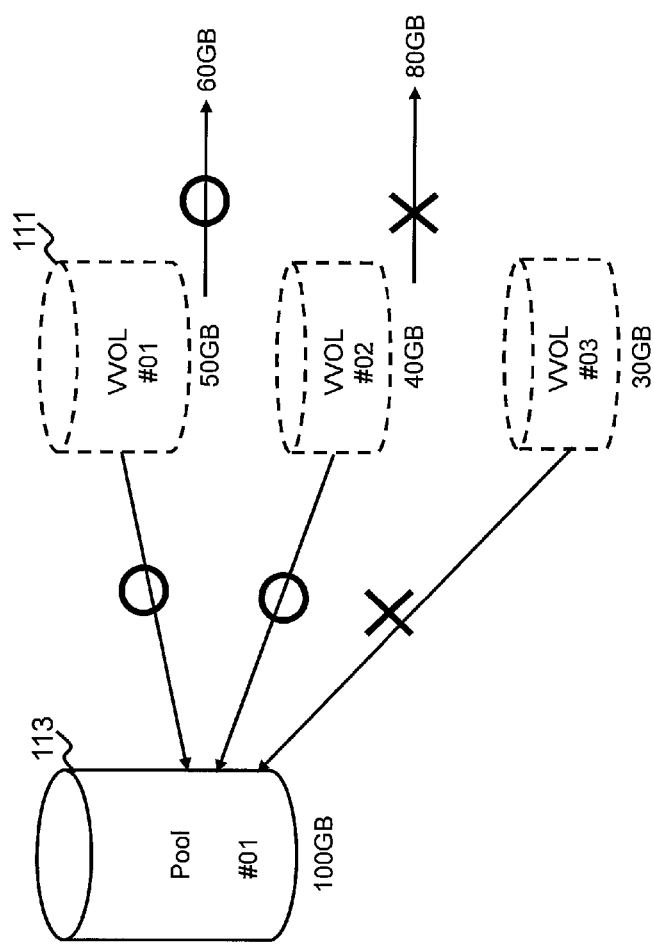
[FIG. 1]

FIG. 1 shows the overview related to the Embodiment 1 of this invention.

The storage apparatus limits the total capacity of VVOLs 111 which can be associated with a pool 113 to the capacity of the pool 113 or smaller. Some of the examples are described below. Note that, in the description of FIG. 1, the capacity of a pool #01 is assumed to be 100 GB (gigabytes). Furthermore, in the description below, the total capacity of one or more VVOLs which are associated with a pool 113 is referred to as a "total VVOL capacity" for the pool 113.

(A) The administrator is assumed to require the storage apparatus to associate a VVOL #01 of 50 GB with a pool #01. In this case, the storage apparatus, in response to the request, associates the VVOL #01 with the pool #01. This is because the capacity of the VVOL #01 (50 GB) is equal to or smaller than the capacity of the pool #01 (100 GB).

(B) Following (A), the administrator is assumed to require the storage apparatus to associate a VVOL #02 of 40 GB with the pool #01. In this case, the storage apparatus, in response to the request, also associates the VVOL #02 with the pool #01. This is because the total VVOL capacity (90 GB (50 GB+40 GB)) is equal to or smaller than the capacity of the pool #01 (100 GB).

(C) Following (B), the administrator is assumed to require the storage apparatus to associate a VVOL #03 of 30 GB with the pool #01. However, in this case, the storage apparatus rejects the request (that is, does not associate the VVOL #03 with the pool #01). This is because the total VVOL capacity (120 GB (50 GB+40 GB+30 GB)) exceeds the capacity of the pool #01 (100 GB).

(D) Following (B), the administrator is assumed to require the storage apparatus to expand the capacity of the VVOL #01 from 50 GB to 60 GB. In this case, the storage apparatus, in response to the request, expands the capacity of the VVOL #01 from 50 GB to 60 GB. This is because the total VVOL capacity (100 GB (60 GB+40 GB)) after expanding the capacity of the VVOL #01 is equal to or smaller than the capacity of the pool #01 (100 GB).

(E) Following (B), the administrator is assumed to require the storage apparatus to expand the capacity of the VVOL #02 from 40 GB to 80 GB. However, in this case, the storage apparatus rejects the request (that is, does not expand the capacity of the VVOL #02 from 40 GB to 80 GB). This is because the total VVOL capacity (130 GB (50 GB+80 GB)) after the capacity expansion of the VVOL #02 exceeds the capacity of the pool #01 (100 GB).

As described above, the storage apparatus limits the total capacity of the VVOLs 111 which can be associated with the pool 113 to the capacity of a pool 113 or smaller. In that case, the storage apparatus considers the status of the actual pages configuring the pool 113. In this embodiment, the actual page status is "free," "assigned," or "in process of zero write."

Figure 2:
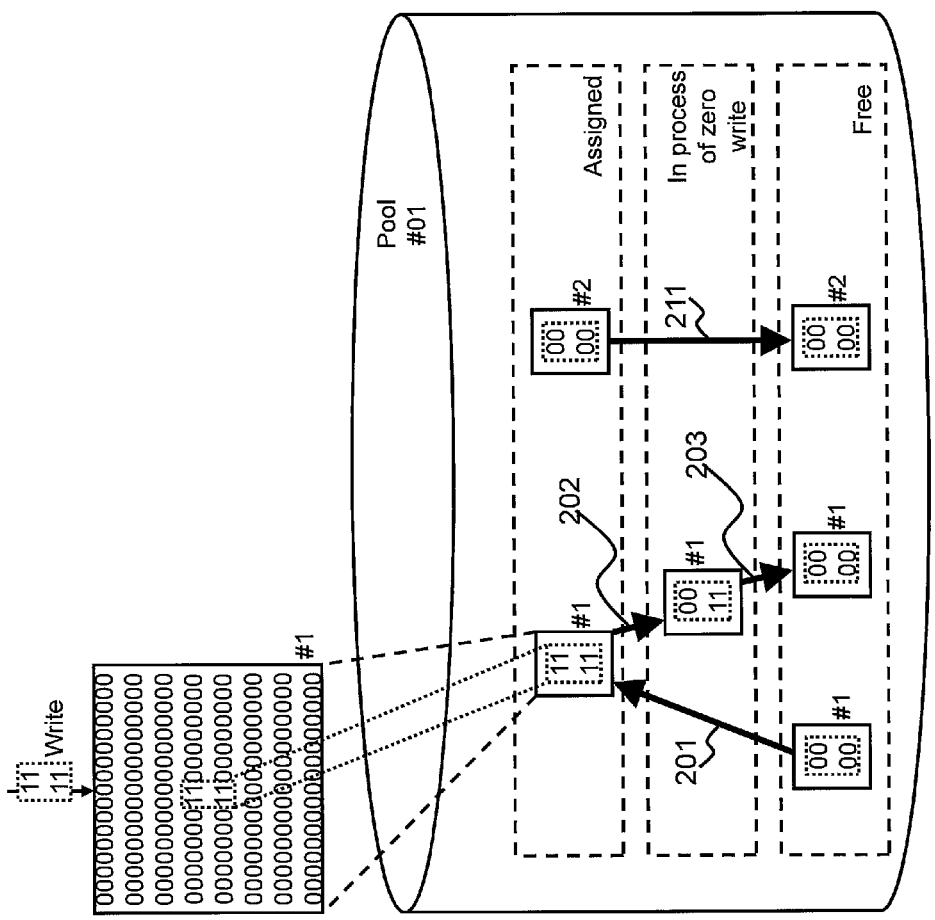
[FIG. 2]

FIG. 2 shows the statuses of actual pages and the transition flow of the statuses.

"Free" indicates that an actual page is not assigned to a virtual page and, at the same time, that the actual page can be assigned to a virtual page. The values of all the bits in the free actual page are "0." That is, a free actual page is an actual page which is already initialized (to which zero is written).

"Assigned" indicates that an actual page is already assigned to a virtual page, and therefore that the actual page cannot be assigned.

"In process of zero write" indicates that all the bit values in the actual page must be made "0" (e.g. the bit value "0" is being written from the head toward the end of the actual page). The actual page in process of zero write is not assigned to a virtual page and, at the same time, cannot be assigned.

The flow of the status change of an actual page is, for example, as described below.

As shown by an arrow 201, the storage apparatus, for write to an unassigned virtual page, assigns a free actual page #1 to an unassigned virtual page. In this case, the storage apparatus transits the status of the actual page #1 from "free" to "assigned." To the entire or a part of the actual page #1, the write target data is written. According to FIG. 2, the write target data is a data of 4 bits and, at the same time, the four bit values are all "1."

As shown by an arrow 202, the storage apparatus transits the status of the actual page #1 from "assigned" to "in process of zero write." The transition is performed triggered by a specified event corresponding to that the data in the actual page #1 is unnecessary (e.g. that the association of a VVOL including a virtual page to which the actual page #1 is assigned with the pool #01 is cancelled).

The storage apparatus, if transiting the status of the actual page #1 to "in process of zero write," performs zero write for the actual page #1 and, by that, updates all the bit values in the actual page # to "0." As more specifically described, the storage apparatus may write the bit value "0" to the entire actual page #1, or may also update only the bit value "1" in the actual page #1 to "0" (according to FIG. 2, "0" is being written to the actual page #1). The timing for starting zero write may be immediately after the status is transited to "in process of zero write" or may also be an arbitrary timing after the status is transited to "in process of zero write."

If all the bit values in the actual page #1 which is "in process of zero write" become "0," the storage apparatus, as shown by an arrow 203, transits the status of the actual page #1 from "in process of zero write" to "free." This is because the actual page #1 can be assigned. Note that, in the description below, an actual page of which all the bit values are "0" is referred to as a "zero page."

As well as the transition flows shown by the arrows 201, 202, and 203, the transition shown by an arrow 211 is also possible. That is, the storage apparatus, regularly or irregularly, searches an "assigned" zero page. The storage apparatus, if detecting an "assigned" zero page #2, as shown by the arrow 211, without transiting the status of the zero page #2 from "assigned" to "in process of zero write," transits the same to "free." This is because the actual page #2 is a zero page already, for which zero write does not have to be performed.

The statuses of actual pages and the transition flow of the statuses are as described above. Note that, though "an unassigned virtual page," in this embodiment, indicates a virtual page to which no actual page is assigned, not limited to the same, a virtual page to which no actual page is practically assigned, for example, a virtual page to which a specified actual page (e.g. a specified zero page) to which specified data is written is assigned may also be permitted. The specified actual page may be common to multiple unassigned virtual pages. In case of writing [data] to an unassigned virtual page, to the virtual page, instead of the specified actual page, a free actual page may be assigned.

According to the description of FIG. 2, a "free" actual page and an "assigned" actual page contribute to a VVOL 111. This is because the "free" actual page can be assigned to an unassigned virtual page in the VVOL 111, and the "assigned" actual page stores the data for the virtual page to which the actual page is assigned (the data which the host apparatus utilizes).

However, an actual page which is "in process of zero write" does not contribute to the VVOL 111. This is because [the page] cannot be assigned to an unassigned virtual page in the VVOL 111.

Therefore, the storage apparatus, in accordance with whether the status of the actual page in the pool 113 is "in process of zero write" or not, limits the total capacity of the VVOL 111 which can be associated with the pool 113 to the capacity of the pool 113 or smaller.

The details of this embodiment are described below.

Figure 3:
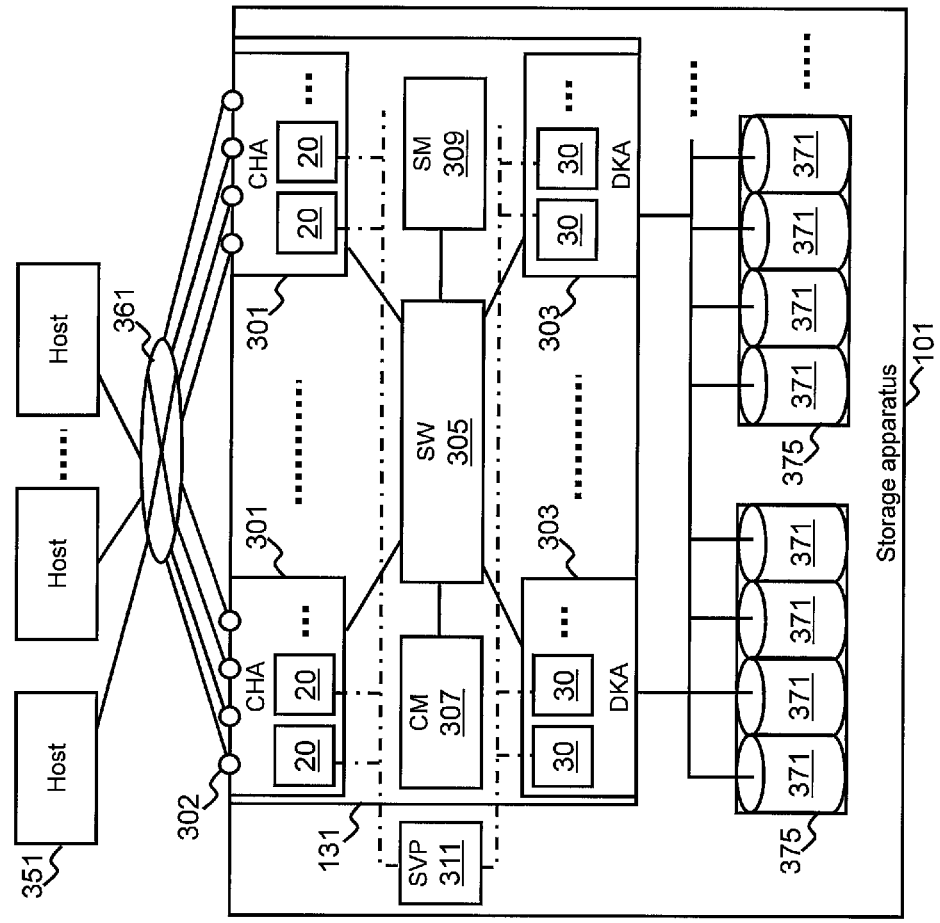
[FIG. 3]

FIG. 3 shows the configuration of the storage apparatus related to the Embodiment 1 of this invention.

To a communication network 361, one or more hosts 351 and the storage apparatus 101 are connected.

The host 351 is a physical or virtual device (e.g. a computer). The host 351 transmits an access command comprising access destination information. The access command is a write command or a read command. The access destination information includes the information indicating the access destination, for example, the identification information associated with the VVOL 111 of the access destination (e.g. LUN (Logical Unit Number)) and the address belonging to the address range of the access destination virtual page (e.g. LBA (Logical Block Address)).

The storage apparatus 101 comprises a physical storage device group, a controller 131, and an SVP (Service Processor) 311.

The physical storage device group is a set of multiple physical storage devices (hereinafter referred to as PDEVs) 371 (e.g. HDDs (Hard Disk Drives) or flash memory devices (e.g. SSDs (Solid State Drives))). The PDEV group comprises one or more RAID (Redundant Array of Independent (or Inexpensive) Disks) groups 375. The RAID group 375 is configured of two or more PDEVs 371, and stores data at a specified RAID level. The pool 113 is based on a storage space of one or more RAID groups 375. The pool 113 is, for example, a set of one or more actual volumes (substantial logical volumes based on one or more RAID groups 375), and each actual volume in the pool 113 may be divided into two or more actual pages 191.

The controller 131 comprises a communication interface with the hosts 351, a communication interface with the PDEVs 371, a memory, and a processor connected to those. As more specifically described, for example, the controller 131 comprises a CHA 301, a DKA 303, a cache memory (hereinafter referred to as a CM) 307, a shared memory (hereinafter referred to as an SM) 309, and a switch device (hereinafter referred to as an SW) 305. The number of these elements is one or larger.

The CHA 301 is a communication interface device with the host 351. The CHA 301 comprises a port 302 and an MP (Micro Processor) 20. The number of these elements is one or larger. The MP 20 processes commands from the hosts 351. For example, the MP 20, in response to a write command received from the host 351 via the port 302, writes the write target data to the CM 307.

The DKA 303 is a communication interface device with the PDEVs 371. The DKA 303 comprises one or more MPs (Micro Processors) 30. The MPs 30 control data input/output to/from the PDEVs 371. For example, the MP 30 writes the write target data stored in the CM 307 to the RAID group 375 based on the actual page which is the write destination of the data.

The CM 307 is a shared memory for multiple MPs 20 and 30, and temporarily stores the data input/output to/from the PDEV group.

The SM 309 is a shared memory for multiple MPs 20 and 30, and stores management information. The CM 307 and the SM 309 may also be the same memory instead of separate memories. That is, one memory may comprise an area used as a CM and an area used as an SM.

To the SW 305, the CHA 301, the DKA 303, the CM 307, and the SM 309 are connected. The SW 305 is, for example, a cross-bus switch, which switches the connection among those elements. The CHA 301, the DKA 303, the CM 307, and the SM 309 may also be connected to one another by other connection parts than the SW 305 (e.g. a bus).

The SVP 311 is one or more computers used for maintenance or management of the storage apparatus 101 (management computer) and, via the LAN (Local Area Network) for example, is connected to the respective MPs 20 and 30. The SVP 311 may also be outside the storage apparatus 101. Furthermore, the SVP 311 may be configured of an input/output console (e.g. an input device and a display device) and a control console (e.g. a control substrate such as a motherboard). Both of the consoles may be in the storage apparatus 101, or it may also be permitted that the control console is in the storage apparatus 101 and that the input/output console is separated from the storage apparatus 101.

Figure 4:
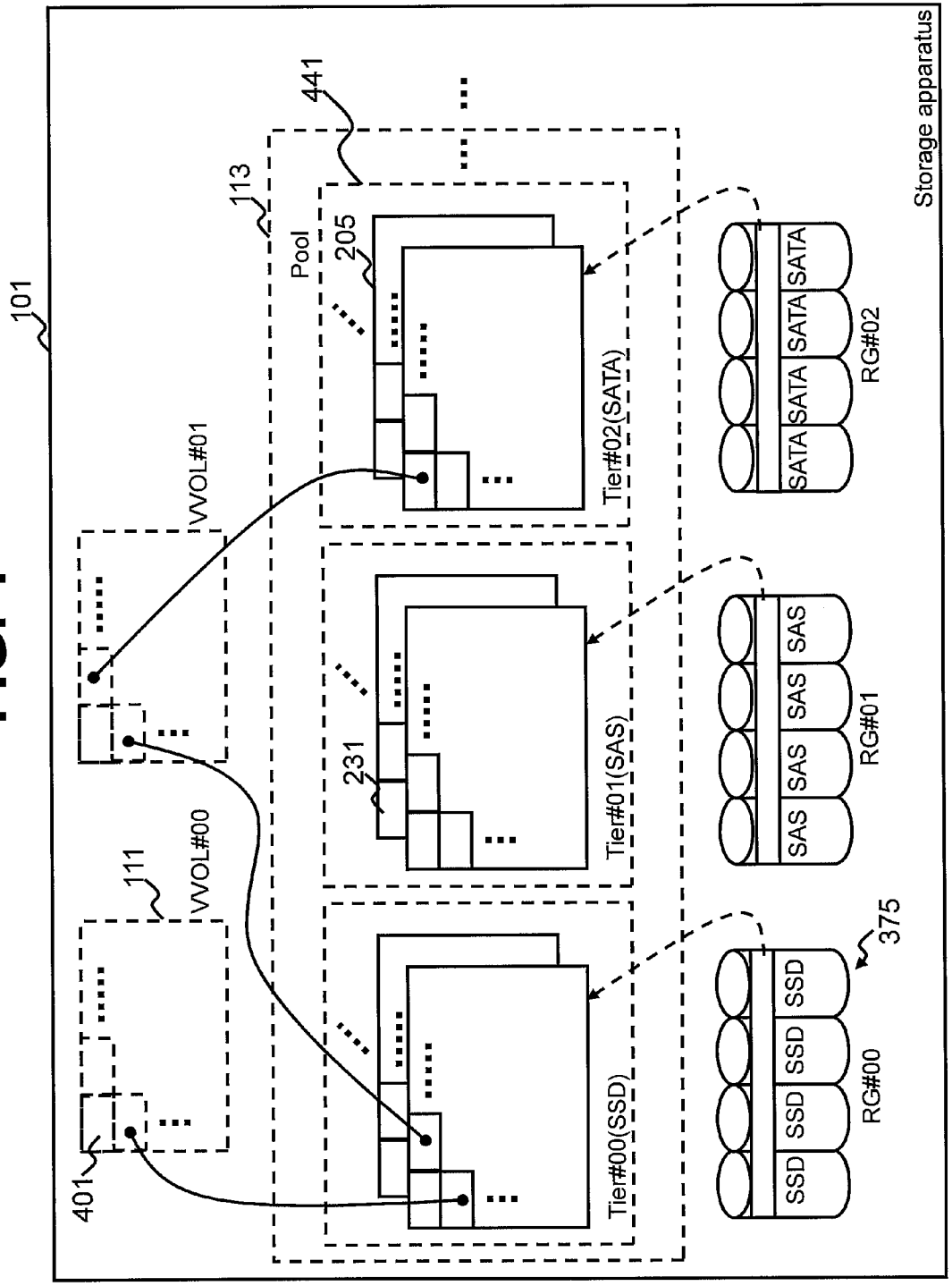
[FIG. 4]

FIG. 4 shows the relationship of various types of storage areas in the storage apparatus 101.

As shown in FIG. 4, ranging from the lower level to the higher level, one or more RGs (RAID groups) 375, one or more pools 113, and one or more VVOLs 111 are managed.

One RG 375 is configured of the same type of PDEVs. The PDEV type is, for example, defined by the performance. The performance is, for example, the data access rate to the PDEVs or the response time (the length of time since the PDEVs receive a command until [the PDEVs] return a response). For example, an RG #00 is configured of multiple SSDs, an RG #01 is configured of multiple HDD-SASs (Serial Attached SCSIs), and an RG #02 is configured of multiple HDD-SATAs (Serial ATAs).
Note that the capacity of multiple PDEVs configuring one RG is the same, for example.

The pool 113 is a set of actual pages 231. As more specifically described, for example, the pool 113 is configured of one or more actual volumes (RVOLs) 205, and each RVOL 205 is configured of one or more actual pages 231. Hereinafter, RVOLs configuring the pool 113 are referred to as "pool VOLs."

Actual pages 231 configuring one pool 113 are hierarchized. That is, multiple tiers 441 exist in one pool 113. A tier 441, for example, exists for each RVOL type. For example, according to FIG. 4, as there are three RVOL types, the number of tiers 441 is also three. Therefore, to one tier 441, RVOLs 205 of the type which corresponds to the tier are supposed to belong. As more specifically described, for example, the tier #00 is of the type called SSD, to which the RVOLs based on the RGs 375 configured of SSDs belong. The tier #01 is of the type called HDD-SAS, to which the RVOLs based on the RGs 375 configured of HDD-SASs belong. The tier #03 is of the type called HDD-SATA, to which the RVOLs based on the RGs 375 configured of HDD-SATAs 375 belong. Note that a tier 441 does not necessarily have to be set for each RVOL type strictly and that multiple RVOLs 205 may also belong to the same one tier 441 based on the RG of the similar type.

The configuration of the pool 113 shown in FIG. 4 is merely an example, and the pool 113 does not necessarily have to be in the multi-tier configuration as shown in FIG. 4. That is, for example, the pool 113 may also be configured of pool VOLs of the same type.

In this embodiment, as described above, the controller 131 limits the total capacity of the VVOL 111 which can be associated with the pool 113 to the capacity of the pool 113 or smaller. Even if the VVOL total capacity is determined to be equal to or smaller than the capacity of the pool 113, the access load can be expected to be distributed. That is because the pool 113 is a group of actual pages based on multiple RGs, and therefore, even if a significant number of accesses for one VVOL are made, those accesses are expected to be distributed to multiple actual pages based on different RGs.

Figure 5A:
FIG. 5A shows a control program 551.

In the configuration shown in FIG. 4, the control on write or read for virtual pages, the control on data reallocation in the pool 113, the control on assigning VVOLs 111 to the pool 113, and the control on the capacity expansion of the VVOL 113 are performed. These controls are, for example, performed by the control program (computer program) 551 shown in FIG. 5A being performed by the processor (e.g. the MP 20). The controller 131 is, for example, stored in a storage resource in the controller 131 (e.g. the SM 309 or the memory in the CHA 301 (not shown in the figure)), read from the storage resource, and performed. The processing performed by the control program 551 being performed is the processing which the controller 131 performs.

Figure 5B:
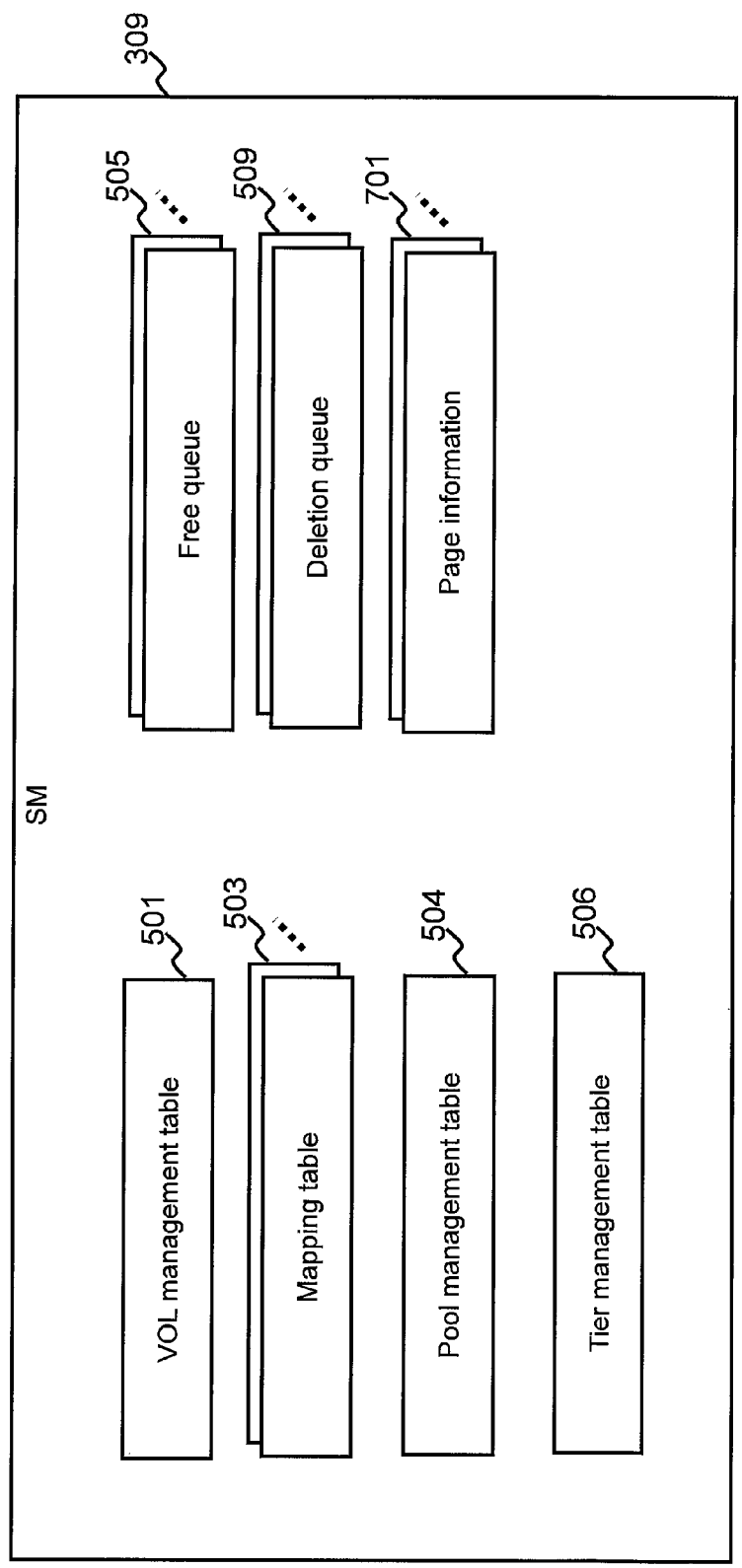
FIG. 5B shows management information which a shared memory (SM) 309 stores.

FIG. 5B shows the management information which the SM 309 stores. Part of the management information may also be stored in the memory in the CHA 301 (not shown in the figure) and/or the memory in the DKA 303 (not shown in the figure)).

The management information, for example, includes the VOL management table 501, the mapping table 503, the pool management table 504, the tier management table 506, the free queue 505, the deletion queue 509, and the page information 701.

The VOL management table 501 comprises the information related to all the VOLs (logical volumes) that the storage apparatus 101 comprises.

The mapping table 503 exists for each VVOL. The mapping table 503 shows the correspondence relationship between the virtual pages and the actual pages. As more specifically described, for example, in the mapping table 503, to the virtual pages to which the actual pages are assigned, the page information 701 of the actual pages is associated.

The free queue 505 exists for each pool VOL. The free queue 505 is a set of columns of page information 701 corresponding to "free" actual pages.

The deletion queue 509 exists for each pool 113. The deletion queue 509 is a set of columns of mapping tables 503 corresponding to the VVOLs whose assignment to the pool 113 are cancelled.

The page information 701 exists for each actual page. The page information 701 comprises the information related to actual pages.

Figure 6:
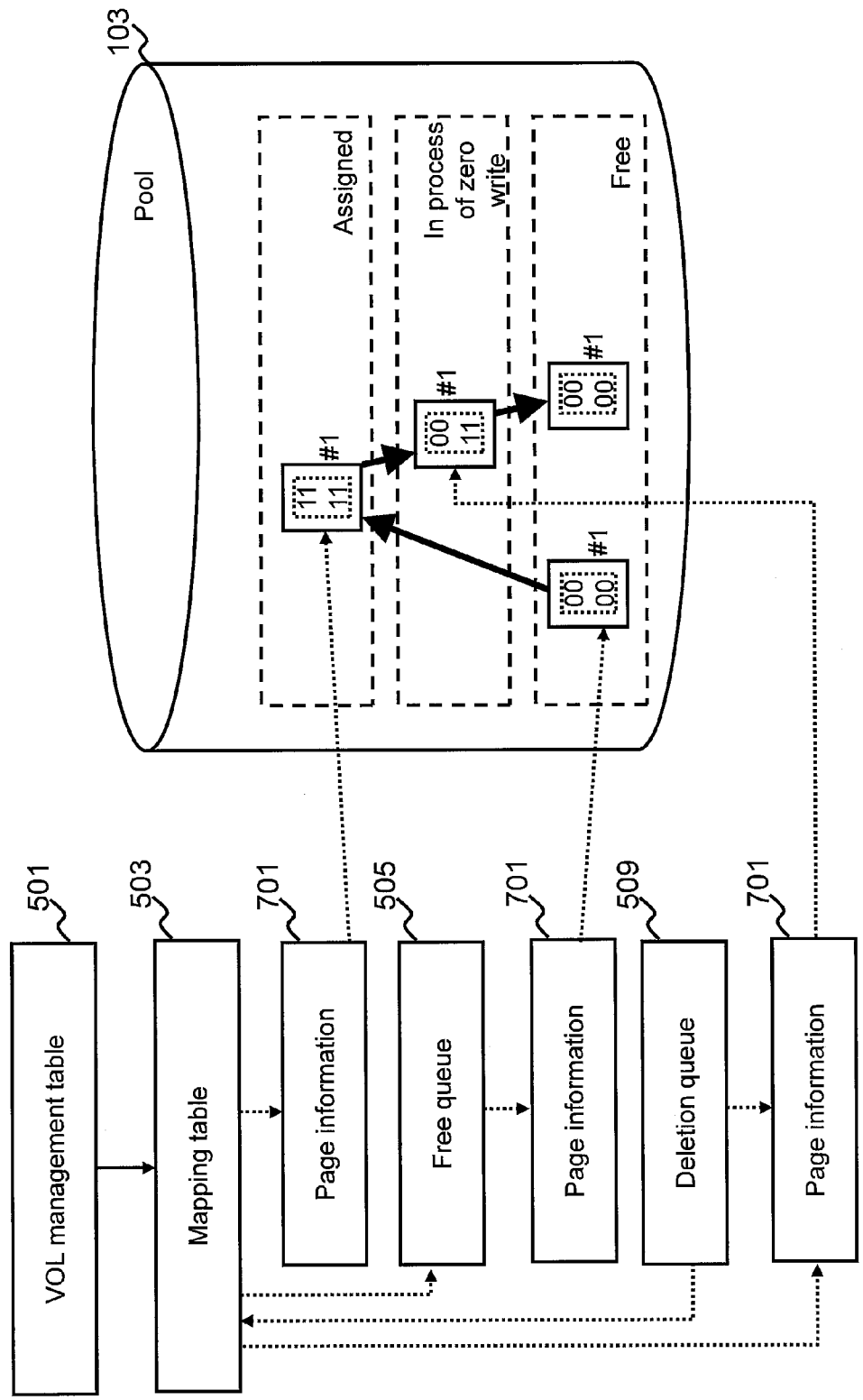
[FIG. 6]

The control program 551 identifies actual pages in the flow shown in FIG. 6.
(A) The control program 551, in accordance with the VOL management table 501, identifies the mapping table 503 corresponding to the target VVOL.
(B1) If the mapping table 503 identified at (A) is not associated with the deletion queue 509 and, at the same time, if the page information 701 of the actual page assigned to the target virtual page is associated to the table 503, the control program 551 identifies the page information 701. The actual page corresponding to the page information 701 is an "assigned" actual page, which is, as more specifically described, the actual page assigned to the target virtual page.

(B2) If the mapping table 503 identified at (A) is not associated with the deletion queue 509 and, at the same time, if the target virtual page is an unassigned virtual page, the control program 551 identifies the page information 701 associated with the free queue 505. The actual page corresponding to the page information 701 is a "free" actual page.

(B3) If the mapping table 503 identified at (A) is associated with the deletion queue 509, the control program 551 identifies the page information 701 associated with the mapping table 503. The actual page corresponding to the page information 701 is an actual page "in process of zero write."

Various types of information which the management information comprises are described below in details. Note that, in the description below, a "free" actual page might be referred to as a "free page," an actual page "in process of zero write" might be referred to as a "zero write page," and an "assigned" actual page might be referred to as an "assigned page."

FIG. 7A shows the VOL management table 501.

The VOL management table 501, for each VOL, comprises the information below,
- a VOL number 5011 which is the identification number of the VOL,
- a VOL type 5012 indicating the type of the VOL,
- a association flag 5013 indicating whether [the VOL is] associated with the pool 113 or not,
- a capacity 5014 indicating the capacity of the VOL,
- a pool number 5015 which is the identification number of the associated pool, and
- a pointer 5016 indicating the identification information of the table to be referred to.

The VOL types are, for example, "virtual," "pool," and "normal." "Virtual" indicates that the VOL is a VVOL. "Pool" indicates that the VOL is a pool VOL (the VOL which is not recognized by the host 351). "Normal" indicates that the VOL is not a pool VOL and an RVOL (actual volume) which is recognized by the host.

As for the association flag 5013, "ON" indicates that the VVOL 111 is associated with the pool 113, and "OFF" indicates that the VVOL 111 is not associated with the pool 113. The association flags 5013 corresponding to the VOLs other than the VVOL are invalid values (e.g. "NULL").

The pointer 5016 corresponding to the VVOL 111 associated with the pool 113 is a valid value, for example, the identification information of the mapping table 503 corresponding to the VVOL 111.

FIG. 7B shows the mapping table 503.

The mapping table 503, for each virtual page which the VVOL 111 corresponding to the table 503 comprises, comprises the information below,
- a virtual page number 5031 which is the identification number of the virtual page and
- a pointer 5032 which is the identification information of the page information 701 corresponding to the actual page assigned to the virtual page.

Figure 8A:
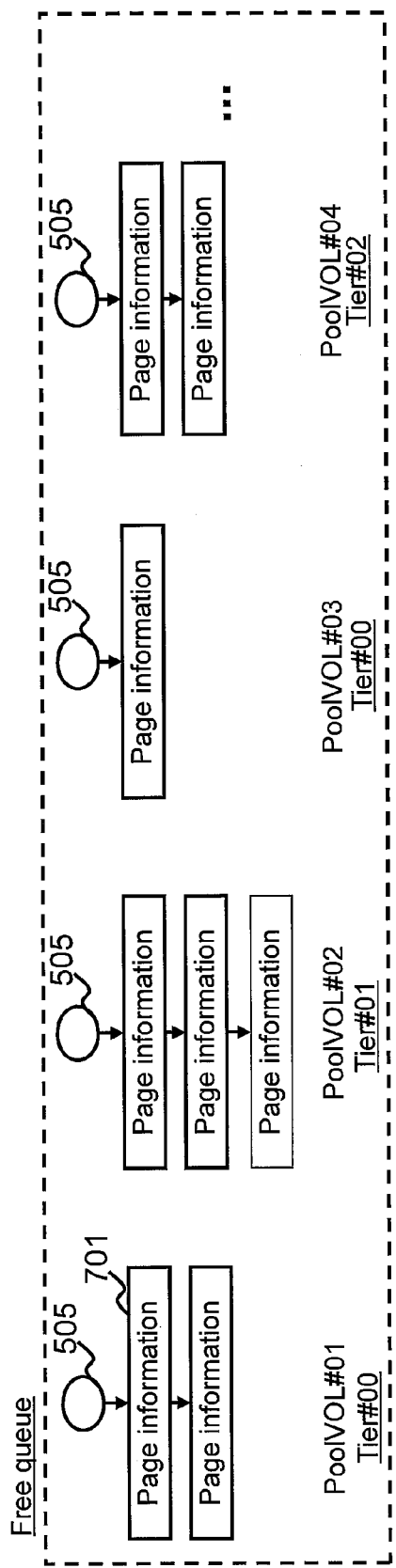
FIG. 8A shows a free queue 505.

FIG. 8A shows the free queue 505.

The free queue 505, as described above, exists for each pool VOL. The free queue 505, for example, comprises the pointer indicating the identification information of the head page information 701. Furthermore, the page information 701 comprises the pointer (refer to FIG. 9A) indicating the identification information of the next page information 701. This helps ascertain the order of the page information 701 associated with the free queue 505.

Figure 8B:
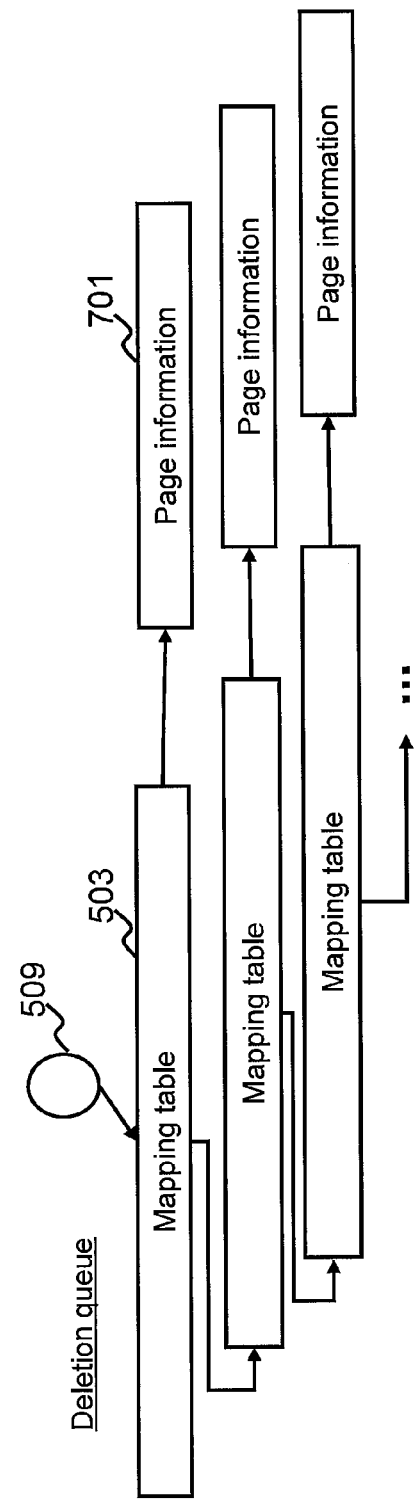
FIG. 8B shows a deletion queue 509.

The FIG. 8B shows the deletion queue 509.

The deletion queue 509, as described above, exists for each pool 113. With the deletion queue 509, the mapping table 503 is associated. The deletion queue 509, for example, comprises the pointer indicating the identification information of the head mapping table 503. Furthermore, in the mapping table 503, though not shown in the figure, the pointer indicating the identification information of the next mapping table 503 is set. This helps ascertain the order of the mapping tables 503 associated with the deletion queue 509.

Furthermore, with the mapping table 503, as shown in FIG. 7B, the page information 701 corresponding to the actual page assigned to the VVOL 111 corresponding to the table 503 is associated. The actual page corresponding to the page information 701 associated with the mapping table 503 associated with the deletion queue 509 is the zero write page.

FIG. 9A shows the page information 701.

The page information 701, for each actual page corresponding to the page information 701 (hereinafter referred to as the "target actual page" in the description of FIG. 9A), comprises the information below,
- a next pointer 7011 which is the identification information of the next page information 701 to the page information 701,
- a pool VOL address 7012 indicating the location of the target actual page (e.g. the address including the VOL number of the pool VOL and the LBA in the pool VOL),
- a VVOL address 7013 indicating the location of the virtual page which is the assignment destination of the target actual page (e.g. the address including the VOL number of the VVOL including the virtual page as the assignment destination and the LBA in the VVOL), and
- a status 7014 indicating the status of the target actual page. The page information 701 may also comprise the number of the tier to which the target actual page belongs.

FIG. 9B shows the pool management table 504.

The pool management table 504, for each pool 113, comprises the information below,
- a pool number 5041 which is the identification number of the pool 113,
- a number of pool VOLs 5042 which is the number of pool VOLs configuring the pool 113,
- a number of actual pages 5043 which is the number of actual pages configuring the pool 113,
- a number of free pages 5044 which is the number of free pages among the actual pages configuring the pool 113,
- a threshold 5045 which is the threshold compared with the usage rate of the pool 113 (the rate of the assigned actual pages to the total number of actual pages configuring the pool 113),
- a number of VVOLs 5046 which is the number of VVOLs associated with the pool 113, and
- a total number of virtual pages 5047 which is the number of virtual pages configuring one or more VVOLs associated with the pool 113. The table 504 may also comprise the value indicating the capacity of the pool 113.

FIG. 26 shows the tier management table 506.

The tier management table 506, for each pool, comprises the information below of each tier.
- a pool number 5061 which is an identification number of the pool comprising the tier,
- a tier number 5062 which is the number of the tier, a PDEV type 5063 which is the information indicating the type of the PDEV which is the base of the pool VOL belonging to the tier, and a page information pointer 5064 which is the pointer for the page information corresponding to the actual page belonging to the tier.

By this table 506, the page information 701 corresponding to the actual page belonging to a certain tier in a certain pool can be identified.

In this embodiment, the control program 551 can perform the processing below.

Write Processing (a1) The control program 551 receives a write command from the host 351.

(a2) The control program 551, in accordance with the access destination information which the received write command comprises, identifies the write destination VVOL and the write destination virtual page.

(a3) The control program 551 writes the write target data complying with the write command to the CM 307 (the control program 551 may respond a write completion to the host 351 at this step).

(a4) The control program 551, in accordance with the mapping table 503 corresponding to the write destination VVOL identified at the (a2), determines whether the write destination virtual page identified at the above-mentioned (W2) is an unassigned virtual page or not.

(a5) If the result of the determination at the above-mentioned (a4) is positive, the control program 551 writes the write target data in the CM 307 to the actual page assigned to the write destination virtual page (the actual page corresponding to the page information 701 associated with the write destination virtual page).

(a6) If the result of the determination at the above-mentioned (a4) is negative, the control program 551 identifies a free page from the free queue 505. At this point, the control program 551 may identify the free page from the free queue 505 corresponding to the highest possible tier.

(a7) The control program 551 makes the free page identified at the above-mentioned (a6) correspond to the write destination virtual page. As more specifically described, for example, the control program 551, as the pointer 5032 corresponding to the write destination virtual page in the mapping table 503, writes the identification information of the page information 701 corresponding to the free page identified at the above-mentioned (a6). Furthermore, the control program 551 excludes the page information 701 corresponding to the identified free page from the free queue 505. Furthermore, the control program 551 updates the page information 701 (for example, writes an invalid value as the next pointer 7011 (e.g. "NULL") and updates the status 7014 from "free" to "assigned").

(a8) The control program 551 writes the write target data in the CM 307 to the page identified at the above-mentioned (a6) (the control program 551 may respond a write completion to the host 351 at this step).

(a9) The control program 551, at the above-mentioned (a5) or (a8), may update the access load information and/or the last access time corresponding to the write destination virtual page. The access load information is the value indicating the access load for the virtual page (e.g. the access frequency (the number of times of accesses per unit of time) or the data transfer rate (the amount of data which is input/output per unit of time). The access load information is the information existing in each virtual page and, for example, may also be included in the mapping table 503.

Read Processing (b1) The control program 551 receives a read command from the host 351.

(b2) The control program 551, in accordance with the access destination information which the read command comprises, identifies the read source VVOL and the read source virtual page.

(b3) The control program 551 determines whether the read target data remains in the CM 307 or not.

(b4) If the result of the determination at the above-mentioned (b3) is positive, the control program 551 transmits the read target data in the CM 307 to the host 351. In this case, the control program 551 may or may not update the access load information and/or the last access time corresponding to the read source virtual page.

(b5) If the result of the determination at the above-mentioned (b3) is negative, the control program 551, in accordance with the mapping table 503, determines whether the read source virtual page identified at the above-mentioned (b2) is an unassigned virtual page or not.

(b6) If the result of the determination at the above-mentioned (b5) is negative, the control program 551 transmits a specified type of data (e.g. an error) to the host 351.

(b7) If the result of the determination at the above-mentioned (b5) is positive, the control program 551 reads the data from the actual page assigned to the read source virtual page, and writes the data to the CM 307. Then, the control program 551 transmits the data in the CM 307 to the host 351.

(b8) The control program 551, in the above-mentioned (b6), may update the access load information and/or the last access time corresponding to the read source virtual page.

Processing Related to Data Reallocation Processing

The control program 551, in accordance with the access load or the last access time corresponding to the assigned virtual page (the virtual page to which the actual page is assigned), determines whether to perform the reallocation processing or not.

For example, the control program 551, if the access load corresponding to a certain virtual page (hereinafter referred to as a "target virtual page" in this paragraph) belongs to the access load range corresponding to the tier which comprises the actual page assigned to the target virtual page, determines not to perform the reallocation processing, and otherwise, determines to perform the reallocation processing. In the reallocation processing, the control program 551 migrates the data in the actual page assigned to the target virtual page to the free page in the tier corresponding to the access load range to which the access load of the target page belongs. Then, the control program 551, to the target virtual page, instead of the migration source actual page, assigns the migration destination actual page.

Meanwhile, for example, the control program 551, if a certain length of time passed after the last access time corresponding to a certain virtual page, determines to perform the reallocation processing, and otherwise, determines not to perform the reallocation processing. In the reallocation processing, the control program 551 migrates the data in the actual page assigned to the target virtual page to a free page in the lower tier than the tier which comprises the actual page. Then, the control program 551, to the target virtual page, instead of the migration source actual page, assigns the migration destination actual page.

Processing in Starting Up Control Program 551

FIG. 10 shows the flow of the processing at the time of starting up the control program 551.

It is determined whether the control program 551 is started up for the first time after the update of the control program (e.g. after the upgrade) (S1001). As more specifically described, for example, if it is not set that [the program] is started up, the control program 551 is determined to be started up for the first time and, if it is set that [the program] is started up, is determined not to be the first startup.

If the result of the determination at S1001 is positive (S1001: YES), the control program 551, in accordance with the information which existed at the point of time when the pre-update control program (the program which does not comprise the function of limiting the total VVOL capacity to the capacity of the pool 113 or smaller) was performed, prepares the information which is necessary for limiting the total VVOL capacity to the capacity of the pool 113 or smaller. As more specifically described, the control program 551 performs the ascertaining of the total VVOL capacity (refer to FIG. 11) (S1002).

After that, the control program 551 is, for example, sets that [the program is] already started up (S1003), and is completed. This makes the result of the determination at S1001 for the second and later startup of the control program 551 negative.

Ascertaining Total VVOL Capacity

Figure 11:
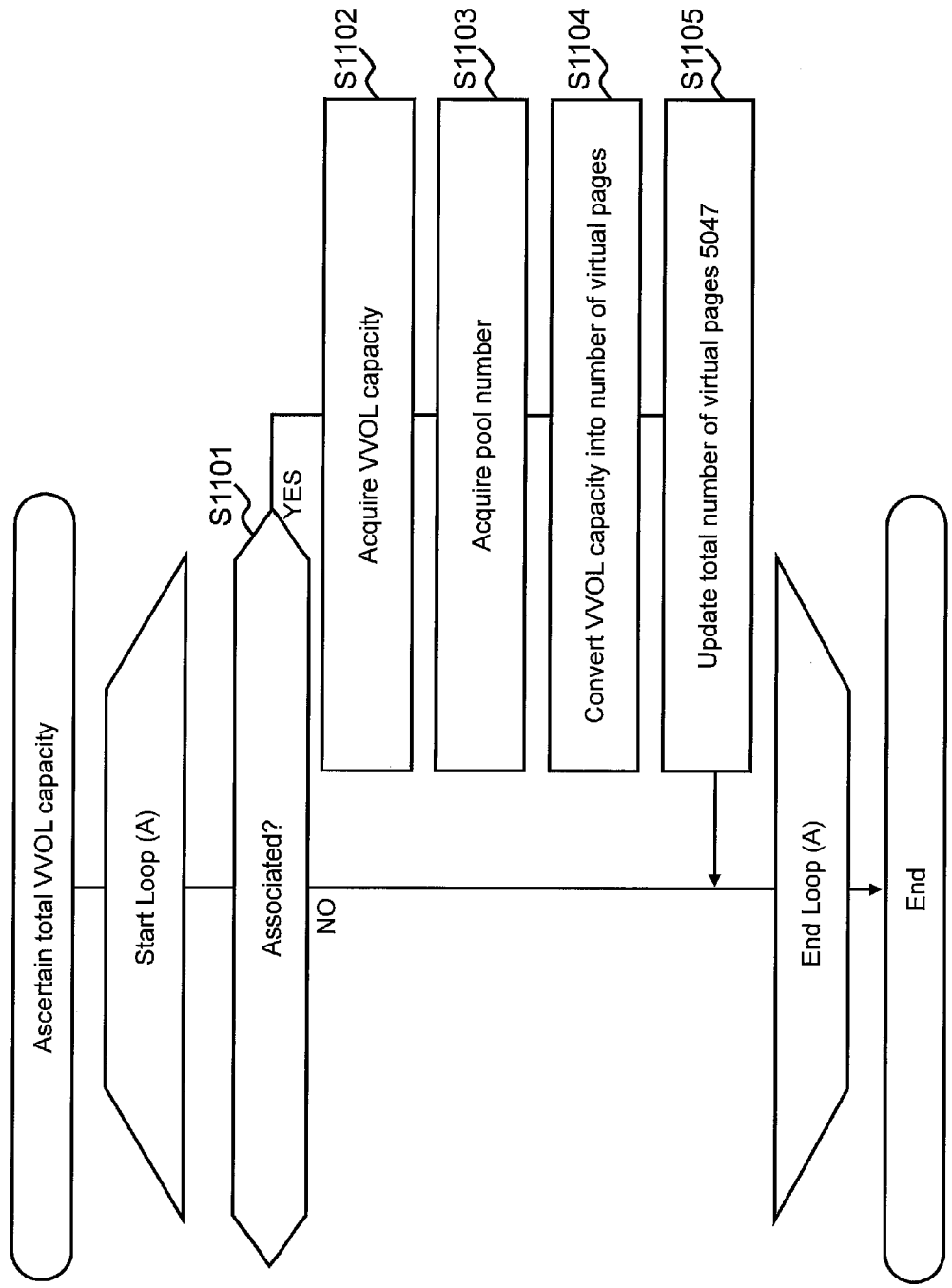
[FIG. 11]

FIG. 11 shows the flow of ascertaining the total VVOL capacity.

The control program 551 performs S1101 for each VVOL (Loop (A)). Hereinafter, the processing in the Loop (A) is described with reference to a VVOL (referred to as a "target VVOL" in the description of FIG. 11) as an example.

At S1101, the control program 551, in accordance with the VOL management table 501, determines whether the target VVOL is associated with any pool 113 or not.

If the result of this determination is positive (S1101: YES), the control program 551, in accordance with the capacity of the target VVOL, for the pool 113 with which the target VVOL is associated (referred to as a "target pool" in the description of FIG. 11), updates the total VVOL capacity. As more specifically described, the control program 551 performs the processing below.

(S1102) The control program 551 acquires the capacity of the target VVOL from the VVOL capacity 5014 corresponding to the target VVOL.

(S1103) The control program 551 acquires the identification number of the pool (pool number) with which the target VVOL is associated from the pool number 5015 corresponding to the target VVOL.

(S1104) The control program 551 converts the capacity of the target VVOL acquired at S1102 into the number of virtual pages. The value acquired by dividing the capacity of the target VVOL by the capacity of the virtual page is the number of virtual pages of the target VVOL.

(S1105) The control program 551 adds the number of virtual pages acquired at S1104 to the total number of virtual pages 5047 corresponding to the target pool (the pool number acquired at S1103).

That is, in the ascertaining of the total VVOL capacity, by the post-update control program 551, the total number of virtual pages 5047 is ascertained (updated).

If the result of the determination at S1101 is negative (S1101: NO), the control program 551 does not perform the steps from S1102 to S1105 for the target VVOL.

For all the VVOLs, if S1101 is performed (from S1102 to S1105 if the result of the determination at S1101 is positive), the Loop (A) is completed.

The completion of ascertaining the total VVOL capacity is the completion of preparing the information which is necessary for limiting the total VVOL capacity to the capacity of the pool 113 or smaller.

Note that the control program 551, each time S1105 is performed, may also determine whether the post-update total number of virtual pages 5047 is equal to or smaller than the number of actual pages 5043 of the target pool (capacity of the target pool) or not. If the result of the determination is negative, the control program 551 may output a warning (e.g. [the program] may output a warning to SVP 311).

Furthermore, for example, the control program 551, after the Loop (A) in FIG. 11 is completed, may determine whether any pool (referred to as a "first pool" in this paragraph) whose total number of updated virtual pages 5047 exceeds the number of actual pages 5043 exists or not. If the result of the determination is positive, the control program 551 may migrate the data in one or more VVOLs associated with the first pool to a pool whose total number of virtual pages 5047 is smaller than the number of actual pages 5043 (referred to as a "second pool" in this paragraph). This is for the purpose of, for the first pool, keeping the total number of updated virtual pages 5047 equal to or smaller than the number of actual pages 5043. As more specifically described, for example, the VVOL migration processing described below may also be performed.

(d1) The control program 551 selects a VVOL associated with the first pool (referred to as a "selected VVOL" in this description).

(d2) The control program 551 searches for the second pool whose total number of virtual pages 5047 is equal to or smaller than the number of actual pages 5043 even if the number of virtual pages in the selected VVOL is added to the total number of virtual pages 5047. If that type of second pool is not found, the VVOL migration processing is ended.

(d3) The control program 551, if the second pool is found at the (d2), migrates the data which the selected VVOL comprises from the first pool to the found second pool in units of actual pages.

(d4) The control program 551 cancels the association of the selected VVOL with the first pool, and associates the selected VVOL with the second pool. As more specifically described, the processing below is performed.

(d41) The control program 551 subtracts the number of virtual pages in the selected VVOL from the total number of virtual pages 5047 of the first pool and, at the same time, subtracts 1 from the number of VVOLs 5046 of the first pool.

(d42) The control program 551 changes the pool number 5015 corresponding to the selected VVOL from the identification number of the first pool to the identification number of the second pool.

(d43) The control program 551 adds the number of virtual pages in the selected VVOL to the total number of virtual pages 5047 of the second pool and, at the same time, adds 1 to the number of VVOLs 5046 of the second pool.

Specification of Association Target VVOL or Association Cancellation Target VVOL The administrator, by using the SVP 311, can associate the VVOL desired by the administrator among the one or more VVOLs which are not associated with the pool 113 with the desired pool 113 among one or more pools 113 or can cancel the association.

For example, the SVP 311, from the control program 551, receives the information which the VOL management table 501 comprises and, in accordance with the information, displays the VVOL list 1211 shown in FIG. 12A. The VVOL list 1211 comprises the information of each VVOL (VVOL number (VOL number of the VVOL), the association flag, the capacity, and the pool number). The SVP 311 accepts the specification of the VVOL desired by the administrator. If the VVOL desired by the administrator is a VVOL whose association flag is "OFF," [the SVP 311] queries the administrator about whether to perform the association or not. If the VVOL desired by the administrator is a VVOL whose association flag is "ON," [the SVP 311] queries the administrator about whether to cancel the association or not.

The SVP 311, if receiving [an instruction for] performing the association for the VVOL whose association flag is "OFF" from the administrator, receives the information which the pool management table 504 comprises from the control program 551 and, in accordance with the information, displays the pool list 1221 shown in FIG. 12B. The pool list 1221 comprises the information of each pool (the pool number, the pool capacity (e.g. the value ascertained in accordance with the number of actual pages 5043), the usage capacity (e.g. the value ascertained in accordance with the number of actual pages 5043 and the number of the free pages 5044), and the threshold). The SVP 311 accepts the specification of the pool desired by the administrator.

VVOL Association

Figure 13:
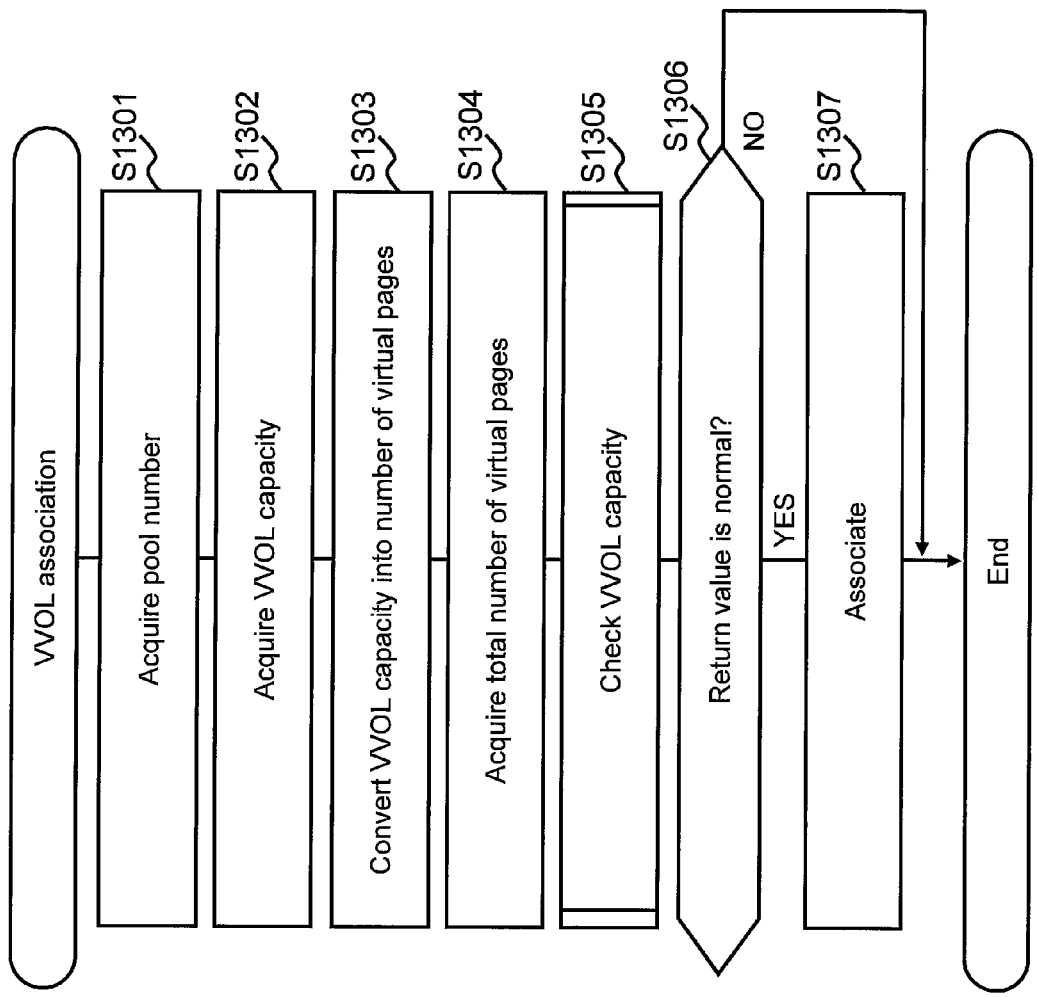
[FIG. 13]

FIG. 13 shows the flow of the VVOL association. This processing is performed, for example, if the control program 551 is instructed to perform VVOL association by the administrator via the VVOL list 1211 (refer to FIG. 12A) and the pool list 1221 (refer to FIG. 12B).

The control program 551 acquires the identification number of the pool (pool number) specified by the administrator (referred to as the "target pool" in the description of FIG. 13 and FIG. 14) from the SVP 311 (S1301).

Furthermore, the control program 551 acquires the identification number (VVOL number) of the VVOL specified by the administrator (referred to as the "target VVOL" in the description of FIG. 13 and FIG. 14) from the SVP 311 and, from the capacity 5014 corresponding to the VVOL number, acquires the capacity of the target VVOL (S1302). Then, the control program 551 converts the VVOL capacity acquired at S1302 into the number of virtual pages (S1303).

Furthermore, the control program 551, from the total number of virtual pages 5047 corresponding to the pool number acquired at S1301 (the total number of virtual pages 5047 of the target pool), acquires the total number of virtual pages (S1304).

The control program 551, in accordance with the number of virtual pages after the conversion at S1303 (the number of virtual pages of the target VVOL) and the total number of virtual pages acquired at S1304 (the total number of virtual pages in the target pool), performs the VVOL capacity check (refer to FIG. 14) (S1305).

If the return value of the VVOL capacity check indicates "Normal" (S1306: YES), the control program 551 associates the target VVOL with the target pool (S1307). As more specifically described, the processing below is performed.

The control program 551 adds the number of virtual pages of the target VVOL to the total number of virtual pages 5047 of the target pool.

The control program 551 adds 1 to the number of VVOLs of the target pool.

The control program 551 updates the pool number 5015 of the target VVOL to the identification number of the target pool.

If the return value of the VVOL capacity check indicates "Abnormal" (S1306: NO), the control program 551 skips S1307, and ends the VVOL association.

VVOL Capacity Check

Figure 14:
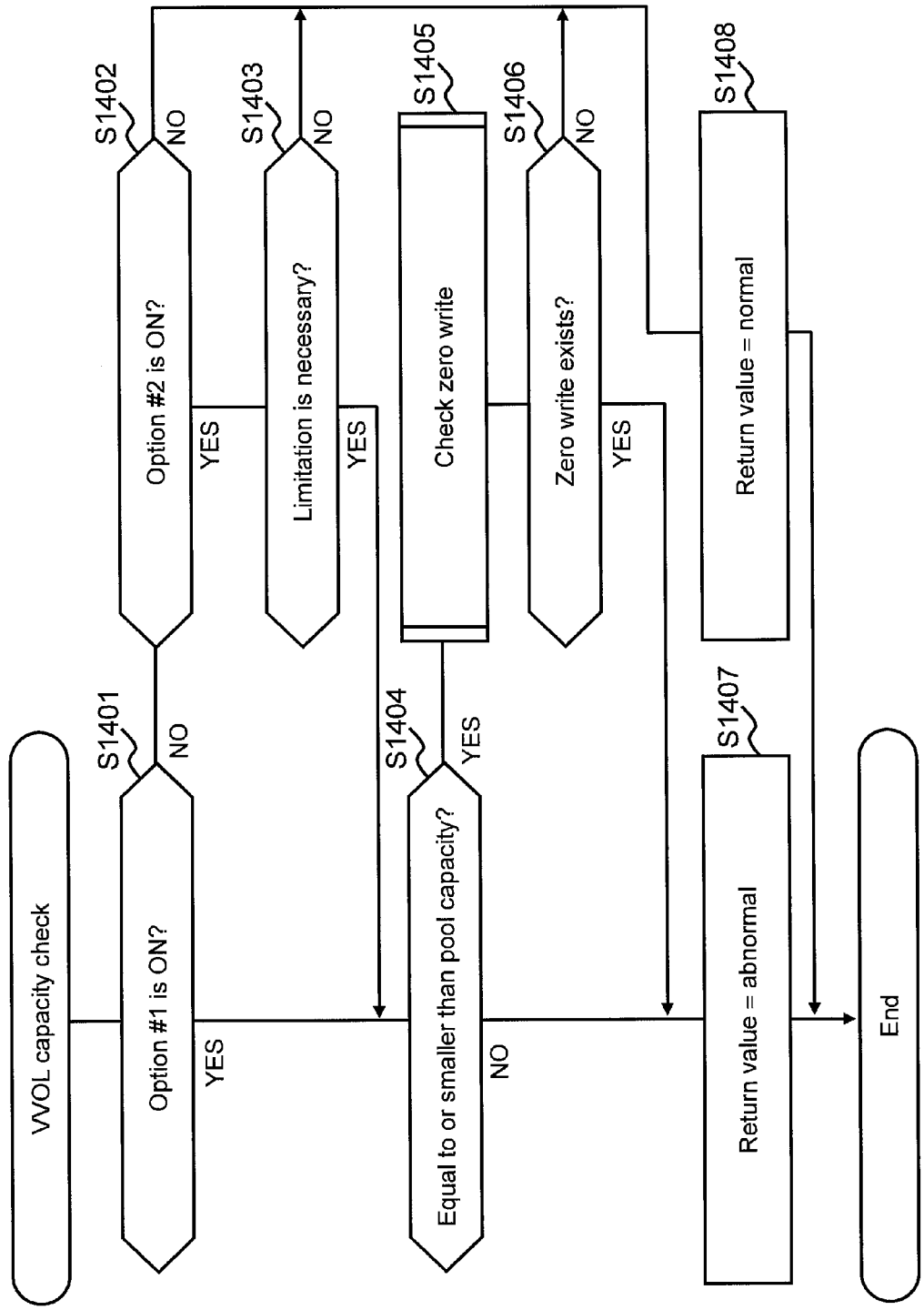
[FIG. 14]

FIG. 14 shows the flow of the VVOL capacity check.

The control program 551 determines whether the option #1 is ON or not (S1401). The "option #1" is a mode in which the limitation of the total VVOL capacity to the capacity of the pool 113 or smaller is performed for all the pools 113 existing in the storage apparatus 101.

If the result of the determination at S1401 is positive (S1401: YES), the processing below is performed.

The control program 551 determines whether the sum of the number of virtual pages in the target VVOL and the total number of virtual pages in the target pool is equal to or smaller than the number of actual pages 5043 of the target pool or not (S1404).

If the result of the determination at S1404 is negative, the sum of the number of virtual pages in the target VVOL and the total number of virtual pages in the target pool is considered to exceed the number of actual pages 5043 of the target pool. In this case, the control program 551 outputs the return value indicating "Abnormal" (S1407). As a result of this, as shown in FIG. 13, S1307 (the association of the target VVOL with the target pool) is not performed.

If the result of the determination at S1404 is positive, the sum of the number of virtual pages in the target VVOL and the total number of virtual pages in the target pool is considered not to exceed the number of actual pages 5043 of the target pool. In this case, the control program 551 performs the zero write check (refer to FIG. 15) (S1405). That is, the control program 551 checks whether a zero write page exists in the target pool or not.

As a result of S1405, if no zero write page exists in the target pool (S1406: NO), the control program 551 outputs the return value indicating "Normal" (S1408). This is because, as the sum of the number of virtual pages in the target VVOL and the total number of virtual pages in the target pool does not exceed the number of actual pages 5043 of the target pool and, at the same time, the target pool does not comprise a zero write page (an actual page which cannot be assigned to the VVOL), the target pool comprises the free pages equal to or larger than the number of virtual pages in the target VVOL. As a result of S1408, as shown in FIG. 13, S1307 (the association of the target VVOL with the target pool) is performed.

As a result of S1405, if a zero write page exists in the target pool (S1406: YES), the control program 551 outputs the return value indicating "Abnormal" (S1407). This is because, even if the sum of the number of virtual pages in the target VVOL and the total number of virtual pages in the target pool does not exceed the number of actual pages 5043 of the target pool, as the target pool comprises the zero write page, it is possible that the target pool might not comprise the free pages equal to or larger than the number of virtual pages in the target VVOL.

If the result of the determination at S1401 is negative (S1401: NO), the control program 551 determines whether the option #2 is ON or not (S1402). The "option #2" is a mode in which the limitation of the total VVOL capacity to the capacity of the pool 113 or smaller is performed only for the pool 113 desired by the administrator among the pools 113 existing in the storage apparatus 101.

If the result of the determination at S1402 is negative (S1402: NO), the control program 551 outputs the return value indicating "Normal" (S1408). This is because both the option #1 and the option #2 are OFF, and therefore, for the target pool, it is not necessary to limit the total VVOL capacity to the capacity of the target pool or smaller.

If the result of the determination at S1402 is positive (S1402: YES), the control program 551 determines whether the target pool is the pool whose total VVOL capacity is required to be limited to the capacity of the pool or smaller or not (S1403). At this point, for example, if the threshold 5045 of the target pool is a valid value or equal to or larger than the first value, the result of the determination at S1403 is positive while, if the threshold 5045 of the target pool is an invalid value (e.g. "NULL") or less than the second value (the second value is equal to or smaller than the first value), the result of the determination at S1403 is negative.

If the result of the determination at S1403 is negative (S1403: NO), the control program 551 outputs the return value indicating "Normal" (S1408). This is because, for the target pool, it is not necessary to limit the total VVOL capacity to the capacity of the target pool or smaller.

If the result of the determination at S1403 is positive (S1403: YES), the control program 551 performs the above-mentioned S1404 and the following processing. This is because, for the target pool, the total VVOL capacity must be limited to the capacity of the target pool or smaller.

According to the flow of the above-mentioned VVOL capacity check, if both the option #1 and the option #2 are ON, the option #1 is prioritized, but the option #2 may also be prioritized instead.

Zero Write Check

Figure 15:
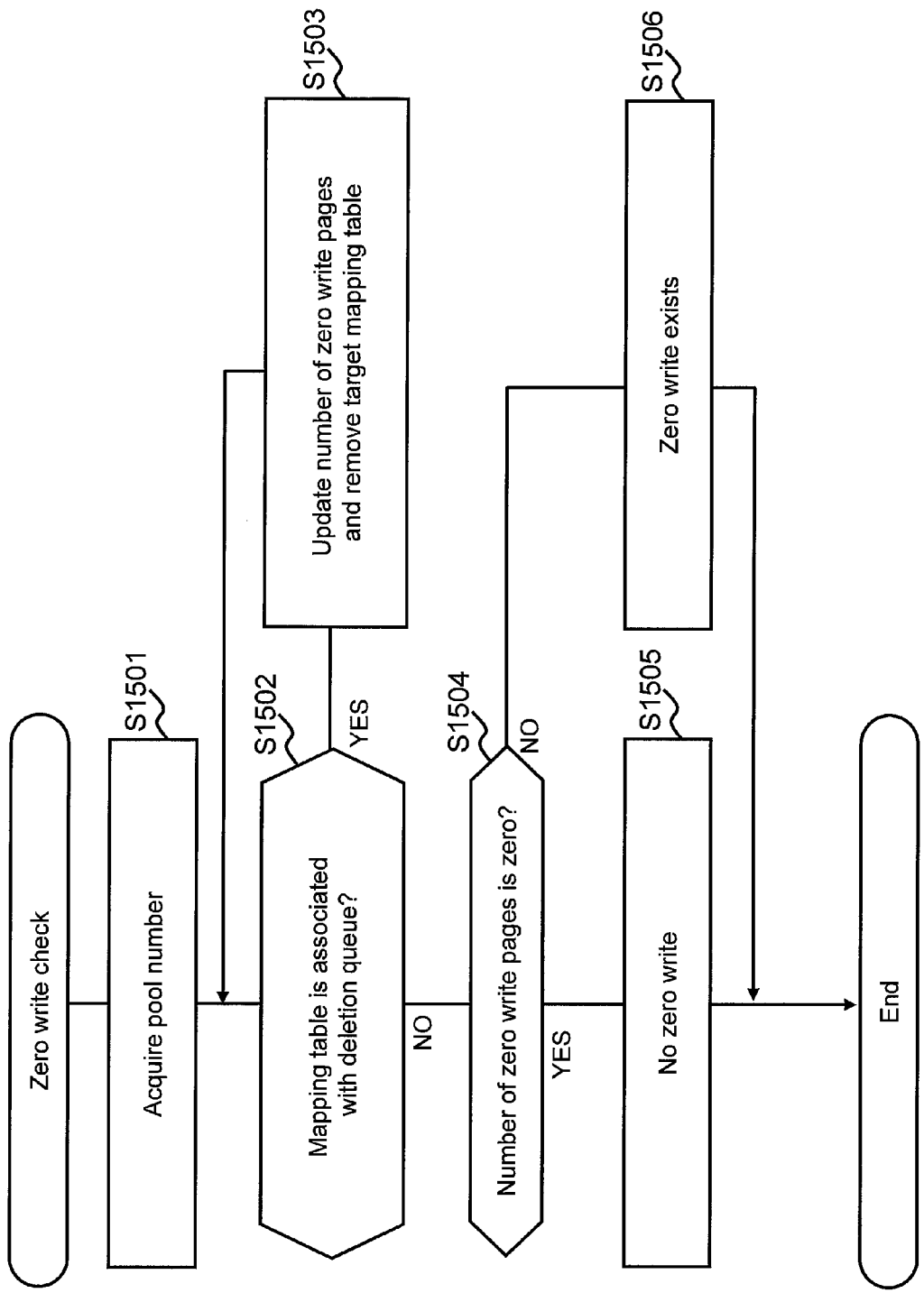
[FIG. 15]

FIG. 15 shows the flow of zero write check.

The control program 551 acquires the identification number (pool number) of the target pool (S1501). The "target pool" referred to at this point, in some cases, indicates the target pool in the description of FIG. 13 and FIG. 14 and, in other cases, indicates the pool associated with the VVOL which is the target of the capacity expansion in the description of FIG. 20.

The control program 551 determines whether the mapping table 503 is associated with the deletion queue (referred to as a "target deletion queue" in the description of FIG. 15) 509 corresponding to the target pool or not (S1502).

If the result of the determination at S1502 is positive (S1502: YES), the control program 551 performs S1503. As more specifically described, the processing below is performed.

(e1) The control program 551 selects a mapping table (e.g. a head mapping table) 503 associated with the target deletion queue 509.

(e2) The control program 551 adds the number of units of page information 701 associated with the mapping table 503 selected at the (e1) to the number of zero write pages.

(e3) The control program 551 removes the mapping table 503 selected at the latest (e1) from the target deletion queue 509.

The control program 551, after removing the mapping table 503 from the target deletion queue 509 at S1503, performs S1502 again.

If the result of the determination at S1502 is negative (S1502: NO), the control program 551 determines whether the number of zero write pages is zero or not (S1504).

If the result of the determination at S1504 is positive (S1504: YES), the control program 551 outputs the result that no zero write page exists (S1505).

If the result of the determination at S1504 is negative (S1504: NO), the control program 551 outputs the result that a zero write page exists (S1506).

VVOL Association Cancellation

Figure 16:
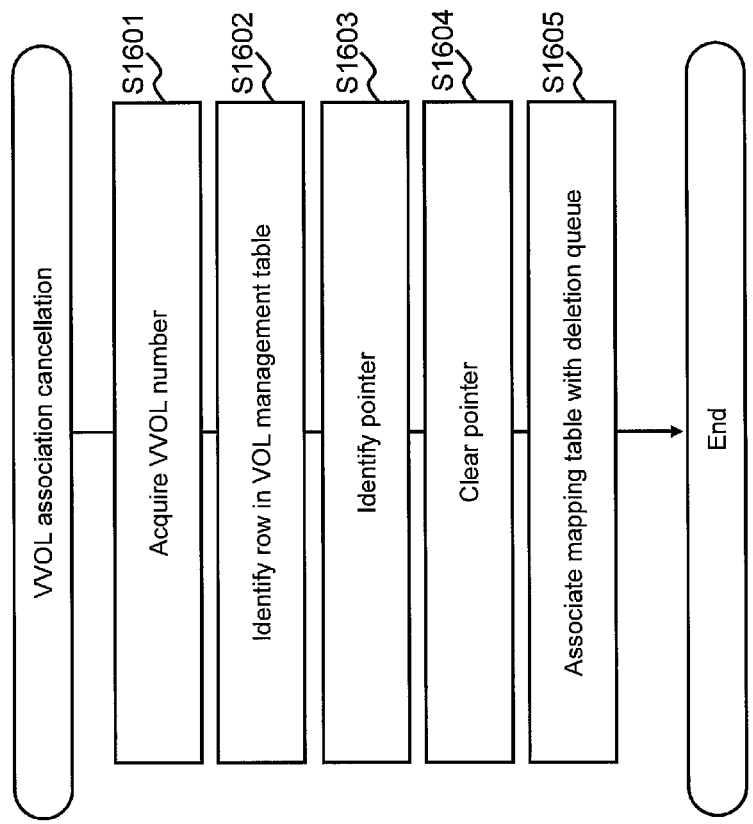
[FIG. 16]

FIG. 16 shows the flow of cancelling the VVOL association. This processing is performed, for example, if the control program 551 is instructed to cancel the VVOL association by the administrator via the VVOL list 1211 (refer to FIG. 12A).

The control program 551 acquires the VOL number (VVOL number) of the VVOL specified by the administrator (referred to as the "target VVOL" in the description of FIG. 16) (S1601).

The control program 551 identifies a row in the VOL management table 501 which comprises the VVOL number acquired at S1601 (S1602).

The control program 551 identifies a pointer 5016 in the row (S1603).

The control program 551 clears the identified pointer 5016 (S1604). For example, the control program 551 updates the pointer 5016 to an invalid value (e.g. "NULL").

The control program 551 associates the mapping table 503 indicated by the pointer 5016 before being cleared (the mapping table corresponding to the target VVOL) with the deletion queue 509 corresponding to the pool with which the target VVOL was associated (S1605).

Zero Write Processing

The control program 551 performs the zero write processing for each pool. In the zero write processing, the control program 551 writes a bit value "0" to the actual page associated with the deletion queue 509 corresponding to the pool (to be exact, the actual page corresponding to the page information 701 associated with the mapping table 503 associated with the deletion queue 509). The timing for starting the zero write processing may be an arbitrary timing after the status of the actual page becomes "in process of zero write." As more specifically described, for example, the following timing can be considered.

The control program 551, immediately after changing the status of the actual page to "in process of zero write," performs zero write for the actual page.

The control program 551 determines regularly or irregularly whether an actual page associated with the deletion queue 509 exists or not and, if the result of the determination is positive, performs zero write for the actual page.

The control program 551, in writing [data] to a virtual page in the VVOL, if no free page exists in the pool with which the VVOL is associated, performs zero write for the actual page in the pool (the actual page for which zero write is completed may be assigned as a free page to the write destination virtual page).

Figure 17:
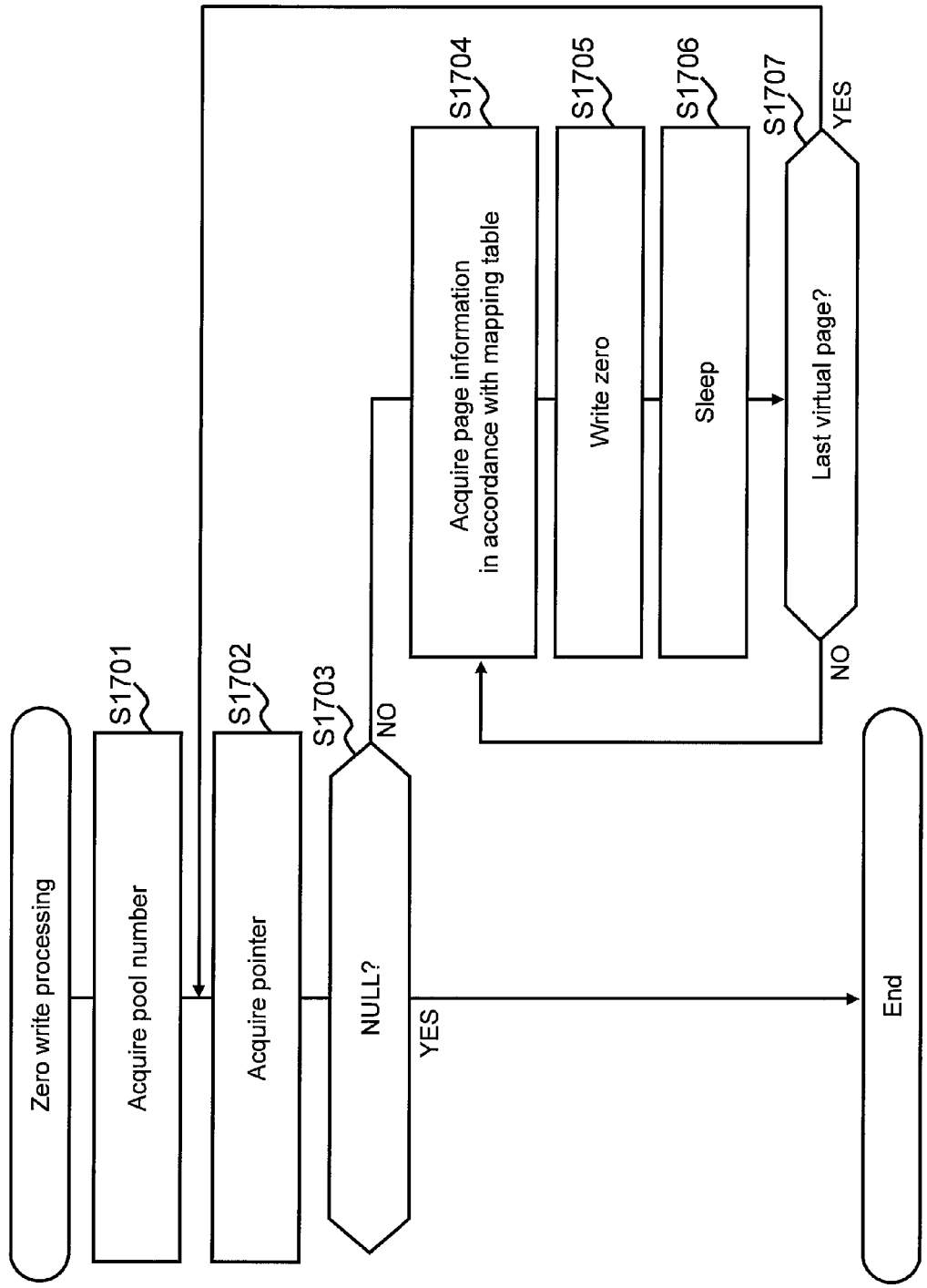
[FIG. 17]

FIG. 17 shows the flow of the zero write processing.

The control program 551 acquires the identification number of the pool (pool number) as the target of the zero write processing (S1701).

The control program 551 acquires the information which the pointer which the deletion queue (referred to as a "target deletion queue" in the description of FIG. 17) 509 corresponding to the acquired pool number comprises indicates or the information which the pointer which the mapping table 503 in the latest S1704 comprises indicates (S1702).

The control program 551, if the information acquired at S1702 is NULL (S1703: YES), ends this processing. This is because no mapping table 503 is associated with the target deletion queue.

The control program 551, if the information acquired at S1702 indicates a mapping table 503 (S1703: NO), from the head virtual page to the last virtual page of the VVOL corresponding to the mapping table 503, for each virtual page whose pointer 5032 indicates the identification information of the page information 701, performs the processing below.

(S1704) The control program 551, in accordance with the pointer 5032 of the virtual page, acquires the page information 701.

(S1705) The control program 551 writes one or more bit values "0" to ensure that all the bit values in the actual page corresponding to the acquired page information 701 become "0."

(S1706) The control program 551, after performing S1705, waits as a sleep time.

(S1707) The control program 551, if the check is not completed to the last virtual page (S1707: NO), performs S1704 for the other virtual pages with which the page information 701 is associated and, if the check is completed to the last virtual page (S1707: YES), performs S1702.

According to the flow shown in FIG. 17, by adjusting the length of the sleep time, the rate of the zero write processing can be adjusted.

For example, if the RG (RAID group) which is the basis of the actual page which is the access destination from the host 351 is the same RG which is the basis of the write destination actual page with the bit value "0," the load of the PDEVs configuring the RG becomes higher, and therefore negatively affects the access from the host 351. Therefore, normally, the control program 551 sets the sleep time to the first length of time. After that, the control program 551, if the number of free pages in the pool is equal to or smaller than a specified value (the specified value is an integer which is 0 or larger), changes the sleep time corresponding to the pool to the second length of time shorter than the first length of time.

Ascertaining Deletion Capacity

The control program 551, for each pool, can ascertain the deletion capacity and display the ascertained deletion capacity in the SVP 311. The "deletion capacity" is the product of the number of zero write pages and the capacity of the actual page.

Figure 18:
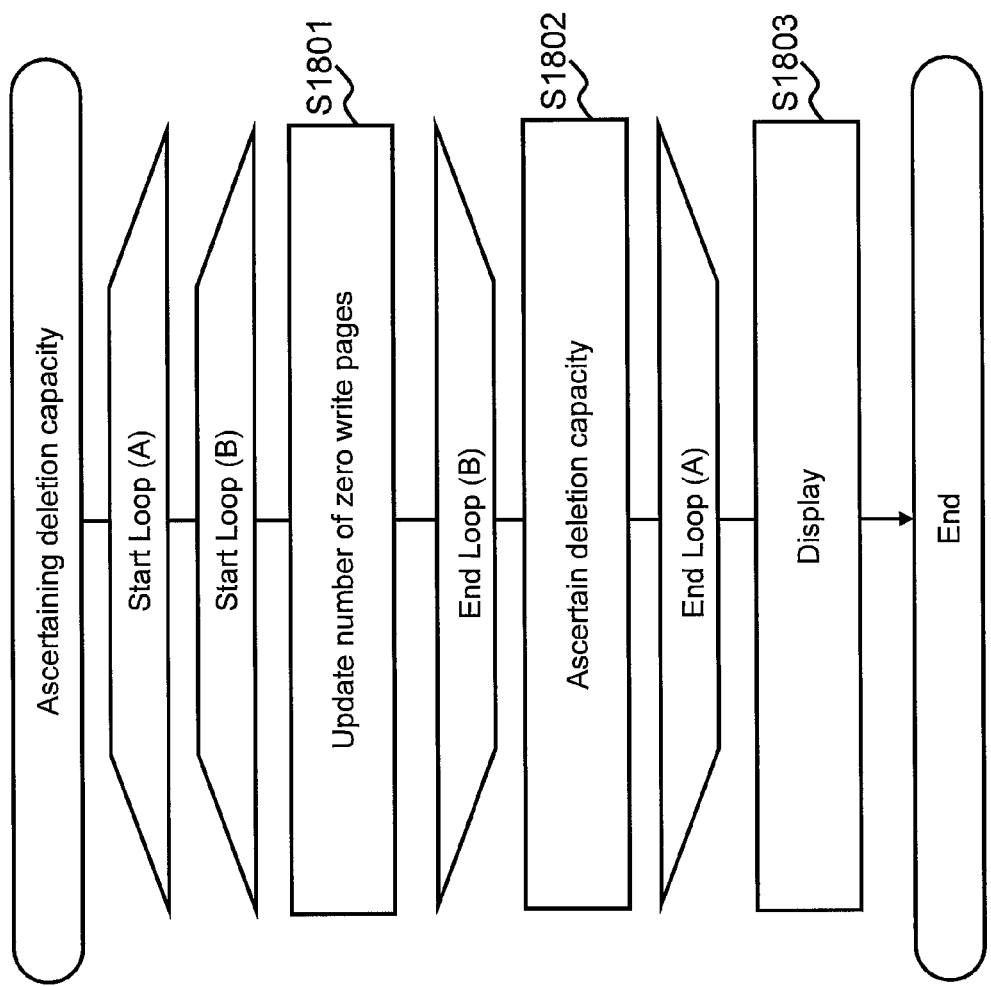
[FIG. 18]

FIG. 18 shows the flow of ascertaining the deletion capacity.

The control program 551 performs S1801 and S1802 (Loop (A)) for each deletion queue 509, and performs S1801 (Loop (B)) for each mapping table associated with the deletion queue 509.

(S1801) The control program 551 ascertains the number of units of page information 701 associated with the mapping table 503 associated with the deletion queue 509, and adds the number to the number of zero write pages.

(S1802) The control program 551 converts the number of zero write pages corresponding to one deletion queue 509 (one pool) into the deletion capacity.

The control program 551 displays the deletion capacity of each pool, as shown in FIG. 19 for example, including the same in the pool list 1901 (S1803).

VVOL Capacity Expansion

Figure 20:
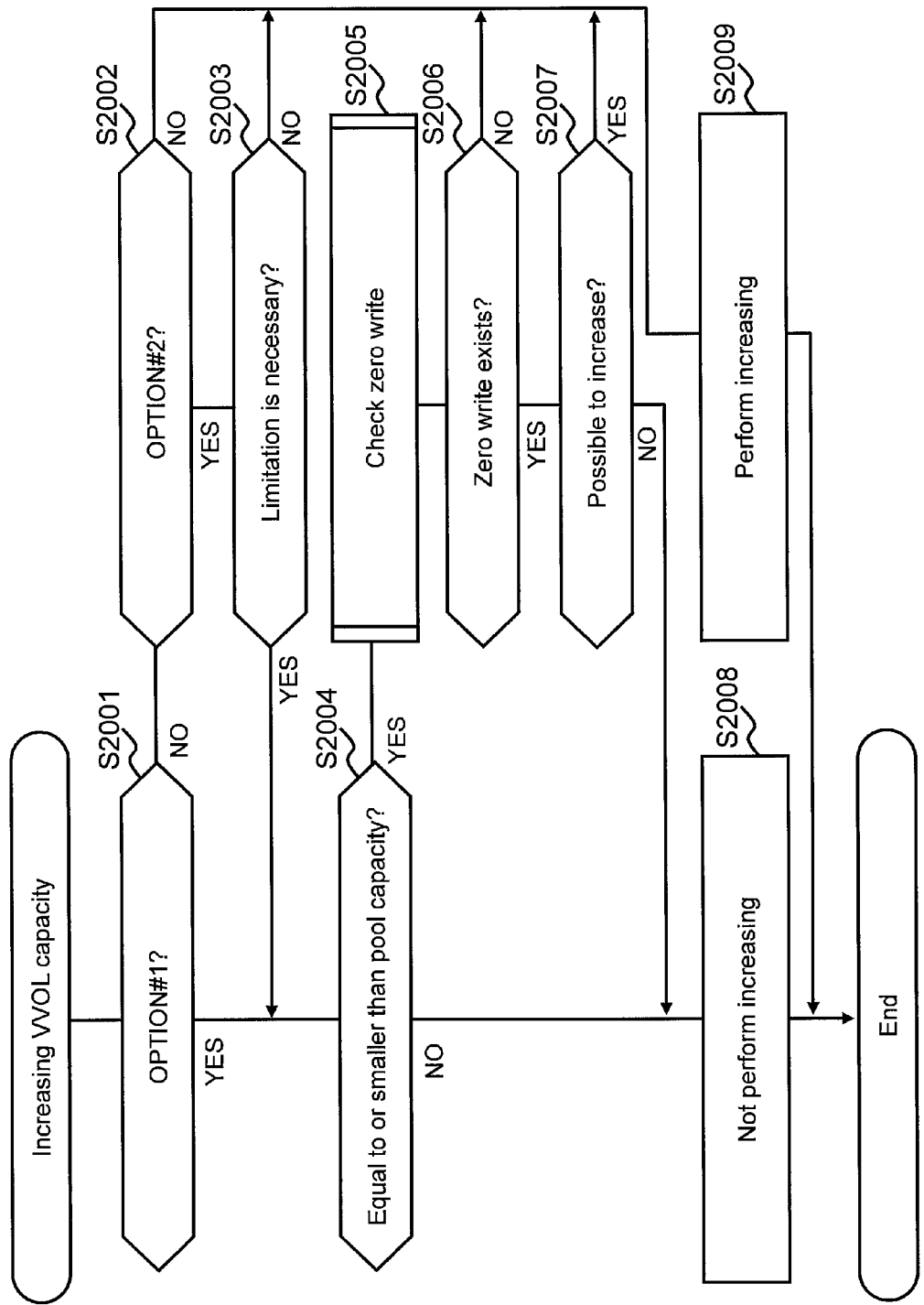
[FIG. 20]

FIG. 20 shows the flow of the VVOL capacity expansion.

The control program 551, in response to a VVOL expansion request from the SVP 311, can expand the capacity of the VVOL desired by the administrator (referred to as the "target VVOL" in the description of FIG. 20). The VVOL expansion request, for example, comprises the information indicating the identification number of the target VVOL and the capacity (expanded capacity) to be added to the capacity of the target VVOL.

According to FIG. 20, the same processing as S1401 to S1406 in FIG. 14 is performed (S2001 to S2006).

Figure 21:
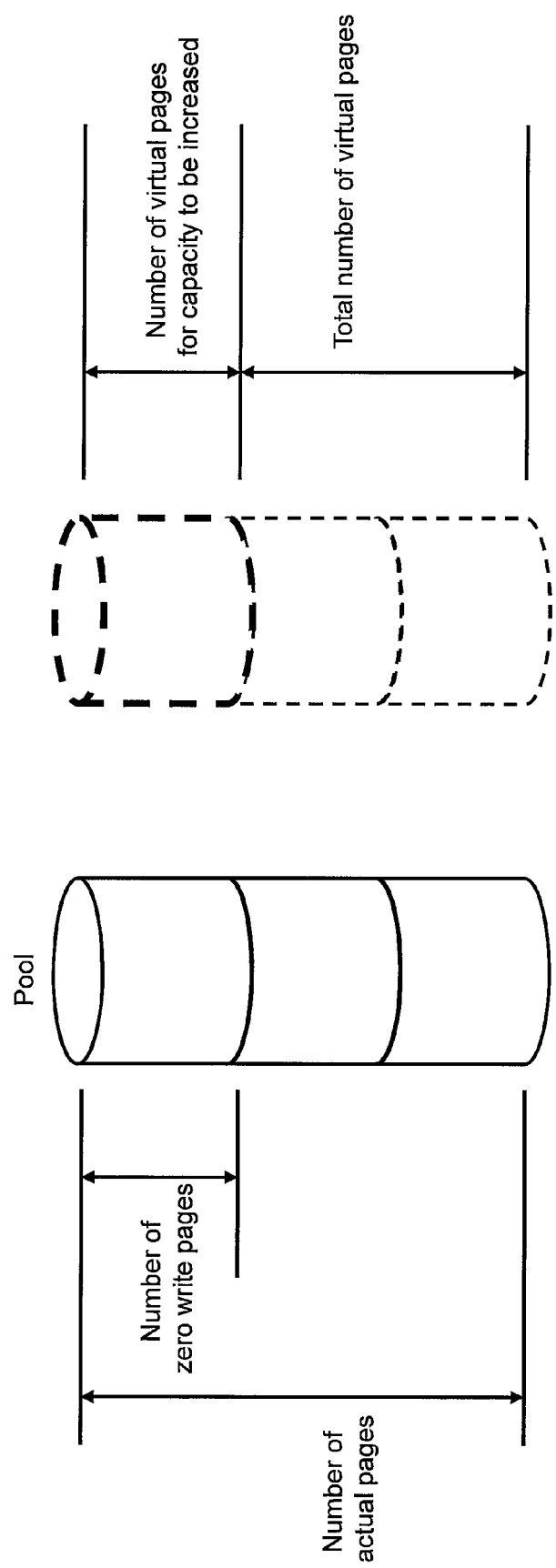
[FIG. 21]

As a result of S2006, if a zero write page exists in the pool with which the target VVOL is associated (referred to as the "target pool" in the description of FIG. 20) (S2006: YES), the control program 551 determines whether the capacity of the target VVOL can be expanded or not (S2007). As more specifically described, the control program 551 determines whether the difference between the number of actual pages and the number of zero write pages in the target pool is equal to or larger than the total number of virtual pages after the capacity expansion or not. As even more specifically described, the control program 551 determines whether the value (P) described below is equal to or larger than the value (Q) described below or not (refer to FIG. 21).

(P) The value ascertained by subtracting the number of zero write pages in the target pool (the total number of units of page information 701 associated with the deletion queue 509 corresponding to the target pool) from the number of actual pages 5043 in the target pool and (Q) The value ascertained by adding the number of virtual pages for the expanded capacity (the number of virtual pages to be expanded) to the total number of virtual pages 5047 of the target pool.

If the result of the determination at S2007 is negative (S2007: NO), the control program 551 does not perform the capacity expansion of the target VVOL (S2008). For example, the control program 551 notifies an error to the SVP 311.

If the result of the determination at S2007 is positive (S2007: YES), the control program 551, in accordance with the above-mentioned VVOL expansion request, expands the capacity of the target VVOL (S2009).

Note that, in case of S2006: YES, the control program 551 may also performed S2008 without performing the determination at S2007.

The Embodiment 1 is as described above.

According to the Embodiment 1, the actual page assigned to the VVOL whose association with the pool is cancelled becomes a zero write page eventually.

Then, according to the Embodiment 1, even if the updated total VVOL capacity is equal to or smaller than the pool capacity, if a zero write page exists in the pool, the VVOL association is specified not to be performed (canceled). This can prevent, after associating the VVOL with the pool, the deficiency of free pages in the pool to be assigned to unassigned virtual pages as the write destination.

Furthermore, according to the Embodiment 1, if the capacity of the VVOL associated with the pool is expanded and if the total VVOL capacity after the capacity expansion exceeds the real capacity of the pool (the difference between the pool capacity and the total capacity of one or more zero write pages), the VVOL capacity expansion is specified not to be performed (canceled). This can prevent, after expanding the VVOL capacity, the deficiency of free pages in the pool to be assigned to unassigned virtual pages as the write destination.

Embodiment 2

The Embodiment 2 of this invention is described below. At this point, the differences from the Embodiment 1 are mainly described, and the description of what is common to the Embodiment 1 is omitted or simplified.

In the Embodiment 2, the control program 551, if the total VVOL capacity after VVOL association is equal to or smaller than the capacity of the pool, even if a zero write page exists in the pool, if the total VVOL capacity after VVOL association does not exceed the real capacity of the pool (the difference between the pool capacity and the total capacity of one or more zero write pages), associates the VVOL with the pool.

As more specifically described, as shown in FIG. 22A, in case of S1406: YES, the control program 551 determines whether the value (X) described below exceeds the value (Y) described below or not (S2201).

(X) The sum of the total number of virtual pages 5047 of the target pool and the number of virtual pages in the target VVOL (VVOL as the target of association) and (Y) The value ascertained by subtracting the number of zero write pages of the target pool (the total number of units of page information 701 associated with the deletion queue 509 corresponding to the target pool) from the number of actual pages 5043 of the target pool.

If the result of the determination at S2201 is positive (S2201: YES), the control program 551 outputs the return value indicating "Abnormal" (S1407).

If the result of the determination at S2201 is negative (S2201: NO), the control program 551 outputs the return value indicating "Normal" (S1408).

According to the Embodiment 2, while achieving the prevention of the deficiency of free pages in the pool to be assigned to unassigned virtual pages as the write destination, the possibility of being able to associate the VVOL with the pool can be increased.

Embodiment 3

In the Embodiment 3 of this invention, the control program 551, in the case (k) described below, instead of not performing (cancelling) the update of the total VVOL capacity (VVOL association or VVOL capacity expansion), after performing S2211 in FIG. 22B, performs S1408 (outputting the return value indicating "Normal") or S2009 (VVOL capacity expansion).

(k) The updated total VVOL capacity (the total VVOL capacity after VVOL association or the total VVOL capacity after the VVOL capacity expansion) is equal to or smaller than the pool capacity and, at the same time, a zero write page exists in the pool, or the updated total VVOL capacity exceeds the real capacity of the pool (the difference between the pool capacity and the total capacity of one or more zero write pages).

At S2211, the control program 551 performs the processing (a) or (b) described below.

(a) The control program 551 waits until the zero write processing is completed. As more specifically described, for example, the control program 551 waits until the zero write pages decrease in the pool (until the status of the zero write pages in the pool transits to "free") to the degree that the real capacity of the pool (the difference between the pool capacity and the total capacity of one or more zero write pages) becomes equal to or larger than the updated total VVOL capacity. The control program 551 may also wait until the number of zero write pages in the pool becomes zero.

(b) The control program 551 associates the target VVOL (the association target VVOL or the VVOL whose capacity is to be expanded) with the second pool instead of the first pool (the pool as the association destination of the VVOL or the pool with which the VVOL whose capacity is to be expanded is associated). The second pool is the pool satisfying the conditions (v) and (w) described below.

(v) The updated total VVOL capacity (the sum of the total VVOL capacity in the pool and the capacity of the association target VVOL or the capacity to be expanded) is equal to or smaller than the pool capacity.

(w) No zero write page exists or the updated total VVOL capacity is equal to or smaller than the real capacity of the pool (the difference between the pool capacity and the total capacity of one or more zero write pages).

According to the Embodiment 3, while achieving the prevention of the deficiency of free pages in the pool to be assigned to unassigned virtual pages as the write destination, the possibility of being able to perform VVOL association or VVOL capacity expansion can be increased.

Embodiment 4

Figure 23:
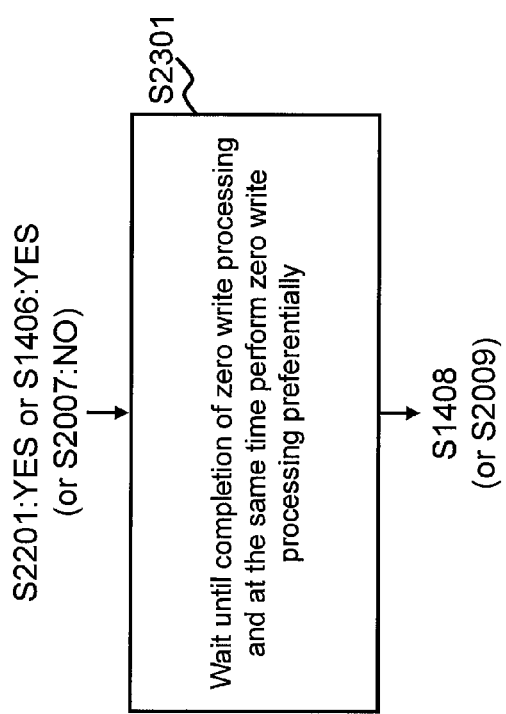
[FIG. 23]

In the Embodiment 4 of this invention, the control program 551, even in the case (k) described in the Embodiment 3, instead of not performing (cancelling) the update of the total VVOL capacity (VVOL association or VVOL capacity expansion), after performing S2301 in FIG. 23, performs S1408 (outputting the return value indicating "Normal") or S2009 (VVOL capacity expansion).

At S2301, the control program 551 waits until the zero write processing is completed and, at the same time, performs the zero write processing (refer to FIG. 17) for the pool whose total VVOL capacity is updated (the pool as the association destination of the VVOL or the pool with which the VVOL whose capacity is to be expanded is associated, hereinafter referred to as a "target pool" in the description of the Embodiment 4) preferentially over the zero write processing for the other pools. Furthermore, the control program 551, at S2301, may set the sleep time in the zero write processing for the target pool as short as possible.

According to the Embodiment 4, while achieving the prevention of the deficiency of free pages in the pool to be assigned to unassigned virtual pages as the write destination, the possibility of being able to perform VVOL association or VVOL capacity expansion rapidly can be increased.

Embodiment 5

Figure 24:
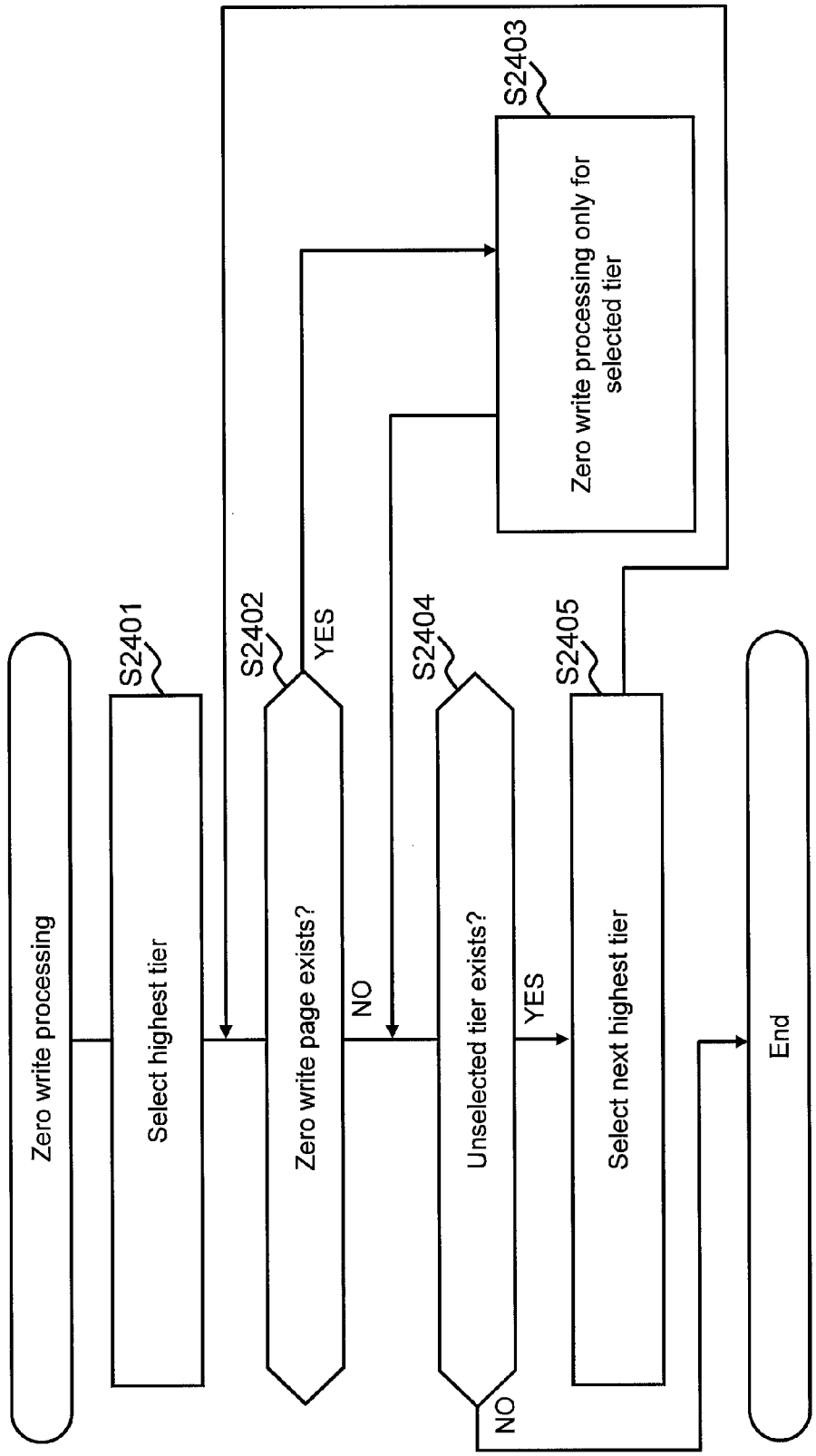
[FIG. 24]

In the Embodiment 5 of this invention, in the zero write processing for the pool, the control program 551 performs zero write for zero write pages (writing the bit value "0") for higher tiers more preferentially. As more specifically described, in this embodiment, the control program 551, instead of the zero write processing shown in FIG. 17, performs the zero write processing shown in FIG. 24.

That is, the control program 551, among the pools as the target of the zero write processing (referred to as the "target pool" in the description of FIG. 25), selects the highest tier (S2401).

The control program 551 determines whether a zero write page exists in the selected tier or not (S2402). As more specifically described, for example, the control program 551, in accordance with the tier management table 506, identifies the page information 701 belonging to the selected tier and, for each unit of the identified page information 701, determines whether the actual page corresponding to the page information 701 is a zero write page or not.

If the result of the determination at S2402 is positive (S2402: YES), the control program 551 updates all the bit values in all zero write pages in the selected tier to "0." (S2403).

After S2403, or if the result of the determination at S2402 is negative (S2402: NO), the control program 551, if an unselected tier exists in the target pool (S2404: NO), selects the next highest tier to the recently selected tier (S2404), and performs S2402. On the other hand, if no unselected tier exists in the target pool, that is, if all the tiers to the lowest are selected (S2404: YES), the control program 551 completes the zero write processing for the target pool.

According to the Embodiment 5, preferentially from the higher tiers (that is, tiers of higher performance), free pages can be increased. This is especially effective, for example, if the tier for initial assignment (the tier as the source of the actual page to be first assigned to an unselected virtual page) is the highest tier.

Note that, in the Embodiment 5, the control program 551, instead of performing zero write for higher tiers more preferentially, may also perform zero write for the zero write page in the tier for initial assignment preferentially over the zero write pages in the other tiers.

Embodiment 6

In the Embodiment 6 of this invention, the control program 551 performs data copy (replication or migration) from the primary VVOL (hereinafter referred to as the PVOL) to the secondary VVOL (hereinafter referred to as the SVOL) and, in that case, might make the actual page assigned to the SVOL a free page. This is for the purpose of eliminating the possibility that the pool with which the SVOL is associated become deficient in free pages.

Hereinafter, with reference to FIG. 25A to FIG. 25C, the Embodiment 6 is described in details.

As shown in FIG. 25A, the PVOL 111P is associated with the pool 113P, and the SVOL 111S is associated with the pool 113S. The pool 113P and the pool 113S are different pools. This is for the purpose of ensuring that no data is lost even if a failure occurs in an RG (RAID group) storing the data in the PVOL 111P.

Furthermore, the capacity of the SVOL 111S is equal to or larger than the capacity of the PVOL 111P.

As shown in FIG. 25A, two actual pages in the pool 113P are assumed to be assigned to the PVOL 111P, and three actual pages in the pool 113S are assumed to be assigned to the SVOL 111S.

At this point, if the pool 113S is not the pool as the target of limiting the total VVOL capacity, if two pages of data in the PVOL 111P are copied to the SVOL 111S, it is possible that the pool 113S becomes deficient in free pages. As more specifically described, for example, in the situation shown in FIG. 25A, if no free page exists in the pool 113S, it is not possible to newly assign actual pages to the SVOL 111S.

Therefore, as shown in FIG. 25B, the control program 551, before copying all the data in the PVOL 111P to the SVOL 113S, might make all the actual pages assigned to the SVOL 113S free pages. As more specifically described, for example, the control program 551 performs the processing from (f1) to (f4) described below.

(f1) The control program 551, in accordance with the mapping table 503 corresponding to the PVOL 111P, the mapping table 503 corresponding to the SVOL 111S, and the pool management table 504, determines whether the free pages equal to or larger than the number of actual pages assigned to the PVOL 111P exist in the pool 113S or not.

(f2) If the result of the determination at the (f1) is positive, the control program 551 makes all the actual pages assigned to the SVOL 111S zero write pages and, at the same time, copies all the data in the PVOL 111P to the SVOL 111S. At that point, to the SVOL 111S, depending on the progress of the copy, free pages are assigned from the pool 113S accordingly, and [the pool 113S] does not become deficient in free pages.

(f3) If the result of the determination at the (f2) is negative, the control program 551 performs the processing below.

(f3-1) The control program 551 makes all the actual pages assigned to the SVOL 111S zero write pages.

(f3-2) The control program 551 waits for the data copy from the PVOL 111P to the SVOL 111S until at least the same number of free pages as the number of actual pages assigned to the PVOL 111P appear in the pool 113S.

(f3-3) During the (f3-2), the control program 551, by performing zero write for a zero write page in the pool 113S, changes the zero write page to a free page. That is, the control program 551 increases free pages in the pool 113S. At that point, the control program 551 may set the sleep time (the length of time since zero write is performed for a certain zero write page until the next time zero write is performed for the zero write page) as short as possible.

(f4) If, by the (f3-3), the free pages equal to or larger than the number of actual pages assigned to the PVOL 111P appear in the pool 113S, the control program 551 completes the (f3-2), and copes the data from the PVOL 111P to the SVOL 111S.

If the data copy from the PVOL 111P to the SVOL 111S is completed, as shown in FIG. 25C, to the SVOL 111S, the same number of actual pages as the number of actual pages which were assigned to the PVOL 111P are considered to be assigned from the pool 113S. Note that, if the data copy from the PVOL 111P to the SVOL 111S is migration, the control program 551 may change all the actual pages assigned to the PVOL 111P to zero write pages.

Though some of the embodiments of this invention are described as above, this invention is not limited to these embodiments, and it is obvious that this invention also comprises any changes or modifications within the spirit and scope hereof. For example, two or more of the Embodiments from 1 to 6 may also be combined.

For example, in S2007 in FIG. 20 and/or S2201 in FIG. 22A, the compared capacities are indicated by the number of pages, instead of which, the capacities indicated by other types of units such as megabytes or gigabytes may also be permitted.

Furthermore, for example, the configuration of the controller 131 is not limited to the configuration shown in FIG. 3. For example, instead of the CHA and the DKA comprising the MPs (microprocessors), other modules (processor modules) than the CHA and the DKA may also comprise MPs.

Reference Sign List

101: Storage apparatus

The invention claimed is:

1. A storage apparatus comprising:
a physical storage device group; and
a controller coupled to a host and the physical storage device group,
wherein a virtual volume is provided which is a virtual logical volume to which Thin Provisioning is applied, and which comprises multiple virtual areas,
a pool is provided which is based on the physical storage device group, and which comprises multiple actual areas,
statuses of an actual area are (1) a first status which indicates that the actual area is already initialized and can be assigned to a virtual area, (2) a second status which indicates that the actual area is already assigned to a virtual area, and (3) a third status which indicates that the actual area cannot be assigned to a virtual area and that initialization, which is a specified data write, is to be performed,
wherein the controller is configured to:
(a) receive a write command for an unassigned virtual area in the virtual volume from the host and, from the pool with which the virtual volume is associated, assign an actual area in the first status, and change the status of the actual area to the second status;
(b) change the status of the actual area assigned to the virtual area to the third status;
(c) initialize the actual area in the third status and, if the initialization is completed, change the status of the actual area to the first status, and
wherein the controller is configured to limit a total virtual volume capacity which is a total capacity of one or more virtual volumes which are associated with the pool, in accordance with whether the pool comprises an actual area in the third status or not, to a capacity of the pool or smaller.

2. A storage apparatus according to claim 1, wherein:
(f) the controller is configured to receive an expansion request which is a request for an expansion process by which the total virtual volume capacity increases;
(g) the controller is configured to determine whether a value (p) described below is equal to or larger than a value (q) described below or not,
(p) a difference between the capacity of the pool and a total capacity of the actual area in the third status in the pool,
(q) a sum of a capacity of an expanded portion of the total virtual volume capacity and the total virtual volume capacity; and
(h) the controller is configured to execute the expansion process in a case where a result of the determination at the (g) is positive.

3. A storage apparatus according to claim 2, wherein
the controller is configured to initialize one actual area in the third status, and by changing the status of the actual area to the first status, one actual area in the third status decreases in the pool, and
(i) the controller, in a case where the result of the determination at the (g) is negative, is configured to wait until the actual area in the third status decreases in the pool to a degree that the value (p) becomes equal to or larger than the value (q), and is configured to then execute the expansion process.

4. A storage apparatus according to claim 3, wherein
there are multiple pools based on the physical storage device group, and
the controller, at the (i), is configured to prioritize initialization of the actual area in the third status in the pool over initialization of an actual area in the third status in another pool of the multiple pools.

5. A storage apparatus according to claim 4, wherein
the controller is configured to initialize one actual area in the third status in the pool with a sleep time period,
prior to the (i), the sleep time is a first time, and
the controller is configured to change the sleep time to a second time that is shorter than the first time at the (i).

6. A storage apparatus according to claim 5,
wherein the expansion process is either a process for associating a new virtual volume with the pool, or a process for expanding the capacity of a virtual volume associated with the pool.

7. A storage apparatus according to claim 2, wherein:
(j) the controller is configured not to execute the expansion process in a case where the result of the determination at the (g) is negative.

8. A storage apparatus according to claim 1, wherein:
(t) the controller is configured to receive an expansion request which is a request for an expansion process by which the total virtual volume capacity increases;
(u) the controller is configured to determine whether the capacity of the pool is equal to or larger than the sum of the capacity of the expanded portion of the total virtual volume capacity and the total virtual volume capacity or not;
(v) the controller, in a case where the result of the determination at the (u) is positive, is configured to determine whether the pool comprises an actual area in the third status or not; and
(w) the controller, in a case where the result of the determination at the (v) is negative, is configured to execute the expansion process.

9. A storage apparatus according to claim 8, wherein:
(x) the controller, in a case where the result of the determination at the (v) is positive, is configured not to execute the expansion process.

10. A storage apparatus according to claim 1,
wherein the controller comprises a storage resource configured to store management information, and a processor configured to execute a computer program,
the management information comprises information denoting the capacity of the virtual volume, information denoting a virtual volume associated with the pool, information denoting the capacity of the pool, and information denoting a status of each actual page in the pool, and
the processor, in a case where the computer program is booted, is configured to
determine whether a boot is the first boot or not, and in a case where the result of the determination is positive,
compute the total capacity of the virtual volume associated with the pool based on the management information, and includes the information denoting the computed total virtual volume capacity in the management information.

11. A storage apparatus according to claim 1,
wherein multiple pools are based on the physical storage device group and there are first and second modes,
in a case where the first mode is ON, all the multiple pools are such that the total virtual volume capacity is limited to the capacity of the pool or smaller,
in a case where the second mode is ON, only a pool that satisfies a predetermined condition of the multiple pools is such that the total virtual volume capacity is limited to the capacity of the pool or smaller, and
in a case where both the first mode and the second mode are ON, the first mode is prioritized.

12. A storage apparatus according to claim 1,
wherein first and second pools and first and second virtual volumes are provided,
the first pool is a pool in which the total virtual volume capacity is limited to the capacity of the pool or smaller,
the second pool is a pool in which the total virtual volume capacity is not limited to the capacity of the pool or smaller,
the first virtual volume is associated with the first pool, and the second virtual volume is associated with the second pool, and wherein:
(A) the controller is configured to change the statuses of all the actual pages assigned from the second pool to the second virtual volume to the third status; and
(B) the controller is configured to copy the data in all the actual pages assigned from the first pool to the first virtual volume to the second virtual volume from the first virtual volume, after the actual page in the third status in the second pool is initialized and the status of the actual page changes to the first status.

13. A storage apparatus according to claim 1,
wherein the controller is configured to compute a total capacity of an actual page in the third status in the pool, and to output information for displaying the computed total capacity.

14. A method for limiting the total capacity of a virtual volume associated with a pool,
wherein the pool comprises multiple actual areas based on a physical storage device group,
the virtual volume is a virtual logical volume to which Thin Provisioning is applied, and comprises multiple virtual areas, statuses of the actual area are (1) a first status which indicates that the actual area is already initialized and can be assigned to a virtual area, (2) a second status which indicates that an actual area is already assigned to a virtual area, and (3) a third status which indicates that the actual area cannot be assigned to a virtual area and that initialization, which is a specified data write,. is to be performed, wherein the status of the actual area transitions as follows:

(a) in writing to an unassigned virtual area in the virtual volume requested by the host, an actual area in the first status is assigned from the pool with which the virtual volume is associated, and the status of the actual area is changed to the second status;

(b) the status of the actual area assigned to the virtual area is changed to the third status;

(c) the actual area in the third status is initialized and, if the initialization is completed, the status of the actual area is changed to the first status, wherein the method limits a total virtual volume capacity which is a total capacity of one or more virtual volumes which are associated with the pool, in accordance with whether the pool comprises an actual area in the third status or not, to a capacity of the pool or smaller.

15. A storage controller comprising:

a communication interface device with a host; and a processor coupled to the communication interface device, wherein a virtual volume is provided which is a virtual logical volume to which Thin Provisioning is applied, and which comprises multiple virtual areas, a pool is provided which is based on a physical storage device group, and which comprises multiple actual areas, statuses of an actual area are (1) a first status which indicates that the actual area is already initialized and can be assigned to a virtual area, (2) a second status which indicates that the actual area is already assigned to a virtual area, and (3) a third status which indicates that the actual area cannot be assigned to a virtual area and that initialization, which is a specified data write,. is to be performed, wherein the processor is configured to:

(a) receive a write command for an unassigned virtual area in the virtual volume from the host and, from the pool with which the virtual volume is associated, assign an actual area in the first status, and change the status of the actual area to the second status;

(b) change the status of the actual area assigned to the virtual area to the third status;

(c) initialize the actual area in the third status and, if the initialization is completed, change the status of the actual area to the first status, and wherein the processor is configured to limit a total virtual volume capacity which is a total capacity of one or more virtual volumes which are associated with the pool, in accordance with whether the pool comprises an actual area in the third status or not, to a capacity of the pool or smaller.

* * * * *